US008182696B2

(12) United States Patent
Theoleyre et al.

(10) Patent No.: US 8,182,696 B2
(45) Date of Patent: May 22, 2012

(54) MULTICOLUMN SEQUENTIAL SEPARATION PROCESS

(75) Inventors: Marc-André Theoleyre, Paris (FR); Stanislas Baudouin, Aubergenville (FR); Annick Merrien, Poissy (FR); Eric Valery, Pulnoy (FR); Olivier Ludemann-Hombourger, Pompey (FR); David Laurent, Nancy (FR); Margit Holzer, Dommartement (FR)

(73) Assignee: Groupe Novasep, Pompey (FR)

( * ) Notice: Subject to any disclaimer, the term of this patent is extended or adjusted under 35 U.S.C. 154(b) by 719 days.

(21) Appl. No.: 12/304,840

(22) PCT Filed: Jun. 18, 2007

(86) PCT No.: PCT/FR2007/001012
§ 371 (c)(1),
(2), (4) Date: Dec. 15, 2008

(87) PCT Pub. No.: WO2007/144522
PCT Pub. Date: Dec. 21, 2007

(65) Prior Publication Data
US 2009/0209736 A1    Aug. 20, 2009

(30) Foreign Application Priority Data

Jun. 16, 2006 (WO) ................. PCT/FR2006/001373

(51) Int. Cl.
*B01D 15/08* (2006.01)
(52) U.S. Cl. .................. 210/659; 210/656; 210/198.2
(58) Field of Classification Search .................. 210/635, 210/656, 659, 198.2
See application file for complete search history.

(56) References Cited

U.S. PATENT DOCUMENTS

| 2,815,332 | A |   | 12/1957 | Grosser |   |
|---|---|---|---|---|---|
| 2,985,589 | A |   | 5/1961 | Broughton et al. |   |
| 4,522,726 | A |   | 6/1985 | Berry et al. |   |
| 5,122,275 | A | * | 6/1992 | Rasche | 210/659 |
| 5,156,736 | A |   | 10/1992 | Schoenrock |   |
| 5,817,238 | A | * | 10/1998 | Makino et al. | 210/659 |
| 5,882,523 | A |   | 3/1999 | Hotier et al. |   |
| 6,245,238 | B1 |   | 6/2001 | Agner |   |
| 6,280,623 | B1 |   | 8/2001 | Ma |   |
| 6,284,200 | B1 |   | 9/2001 | Hotier |   |
| 6,328,895 | B1 | * | 12/2001 | Masuda et al. | 210/659 |
| 6,375,851 | B1 |   | 4/2002 | Sterling et al. |   |
| 6,419,828 | B1 |   | 7/2002 | Russo, Jr. |   |
| 6,482,323 | B2 | * | 11/2002 | Tanimura et al. | 210/635 |
| 2003/0173299 | A1 | * | 9/2003 | Heikkila et al. | 210/656 |
| 2009/0209736 | A1 | * | 8/2009 | Theoleyre et al. | 530/413 |

FOREIGN PATENT DOCUMENTS

| EP | 0821988 A1 | 2/1998 |
|---|---|---|
| EP | 0846483 A1 | 6/1998 |
| FR | 1546823 | 10/1968 |
| GB | 1191514 | 5/1970 |
| WO | 9832514 A1 | 7/1998 |

* cited by examiner

*Primary Examiner* — Ernest G Therkorn
(74) *Attorney, Agent, or Firm* — Marsh Fischmann & Breyfogle LLP

(57) ABSTRACT

A process is disclosed for separating biomolecules from an aqueous solution containing the biomolecules and impurities, having different affinities and/or interactions with a solid support. The solution is passed over a fixed bed of chromatographic resin containing at least three zones, with flow of liquid being arranged between adjacent zones and between a last and first zone. Each of several sequences includes at least an adsorption stage, a rinsing stage, or a desorption stage, with each subsequent sequence being carried out by a downstream displacement of fronts in the zones by approximately the same increment before the periodical displacement of the introduction and withdrawal points.

21 Claims, 19 Drawing Sheets

SEQUENCE 1

SUB-SEQUENCE 1.1

SUB-SEQUENCE 1.2

SEQUENCE 2

SUB-SEQUENCE 2.1

SUB-SEQUENCE 2.2

SEQUENCE 1

SUB-SEQUENCE 1.1

SUB-SEQUENCE 1.2

SEQUENCE 2

SUB-SEQUENCE 2.1

SUB-SEQUENCE 2.2

SEQUENCE 1

SUB-SEQUENCE 1.1

SUB-SEQUENCE 1.2

SUB-SEQUENCE 1.3

SEQUENCE 2

SUB-SEQUENCE 2.1

SUB-SEQUENCE 2.2

SUB-SEQUENCE 2.3

Sequence 1 sub-sequence 1.1 sub-sequence 1.2 sub-sequence 1.3 sub-sequence 1.4

Sequence 2 sub-sequence 2.1 sub-sequence 2.2 sub-sequence 2.3 sub-sequence 2.4

Sequence 1 sub-sequence 1.1 sub-sequence 1.2 sub-sequence 1.3

Sequence 2 sub-sequence 2.1 sub-sequence 2.2 sub-sequence 2.3

MULTICOLUMN SEQUENTIAL SEPARATION PROCESS

REFERENCE TO RELATED APPLICATIONS

This application is a 371 of PCT/FR07/01012 filed Jun. 18, 2007.

FIELD OF THE INVENTION

A subject of the present invention is a multicolumn sequential adsorption separation process. The invention is applicable generally to any separation involving an interaction between a product of interest and a stationary phase. The invention applies in particular to the purification of molecules of interest, in particular biomolecules, proteins, antibiotics, amino acids, polynucleotides and polypeptides and other biological and chemical molecules.

PRIOR ART

The chromatography (in general liquid chromatography) purification processes are characterized by bringing one or more liquid phase(s) (called mobile phase(s)) into contact with a solid phase (called a stationary phase). The product of interest injected in the liquid phase produces one or more interactions of various kinds with the stationary phase depending on the chromatographic separation technique selected: normal or reversed-phase chromatography, ion exchange, affinity, size-exclusion, hydrophobic interaction, etc. chromatography. Its displacement within the chromatographic device is therefore different from the displacement of the other products contained in the feed to be treated. Based on this difference in interaction, it is possible to purify or enrich one of the fractions in the molecule of interest.

For example, the production of an amino acid, such as lysine, by fermentation leads to an aqueous culture broth containing the dissolved amino acid (for example lysine), microorganisms and impurities essentially consisting of residues from substrates and from cellular metabolism of said microorganisms. Similarly, the lysine may also be available in combination with other elements in an aqueous solution, which has to be purified in order to extract the lysine. The amino acids and in particular lysine are food supplements commonly used in the agri-food industry for livestock. Thus, the separation of solutions containing lysine, or any other amino acid, can be carried out by a chromatographic technique, in this case on an ion exchange resin.

In the area of the purification of biomolecules, the target molecule is contained in a complex mixture, obtained for example from a fermentation medium (as in the case of lysine), or from a solution extracted from animal or plant tissues. The target molecule is present at low concentration and in many cases it is not the main species. Purification of these complex media uses the chromatographic separation techniques mentioned above.

The stages that make up a process of purification can be implemented in various ways, the most conventional being the so-called batch mode in which each of the stages takes place successively in a single column consisting of the stationary phase. In order to improve the possibilities of separation between the numerous constituents that are present, in this batch mode it is possible to use different eluents in succession. The latter make it possible to vary the distribution coefficients of the various compounds between the stationary phase and the eluting liquid phase. Thus, a species that would have a strong affinity for the stationary phase under certain elution conditions can lose this affinity entirely if the elution conditions are changed. This chromatographic technique using several eluents requires a succession of stages. It makes it possible to apply a principle of separation by adsorption and then desorption. It permits the extraction of the desired molecule from a mixture or the purification of a solution by removing an unwanted impurity.

For example, the ion exchange purification processes on a solid support, activated carbon or resin, are characterized by a succession of stages, repeated cyclically, which can include a stage of fixation, of elution, and of regeneration. In certain cases there may be several regeneration and rinsing phases. Based on said batch process, the most robust solution for ensuring continuous production is to have at least two columns, one in production, while the other successively undergoes all the stages of regeneration. Production is then continuous but the various flows produced during regeneration are not. It is the quest for continuous availability and limitation of the volumes of fluids used in rinsing and regeneration that has led industry to go further in the development of continuous operations.

Despite their simplicity, batch systems are still rather unsuitable for certain problems of ion exchange, in particular when the solution to be treated has a very high level of impurities. In fact, the volume of resins employed is not calculated in relation to the hourly flow rate but in relation to the desired autonomy between two cycles, which leads to the immobilization of volumes of exchanger that may be considerable. The quest for continuity of operations is a general trend in industry and in the food industry in particular. The advantages expected from it are, in addition to continuous flows, a decrease in volumes in interim storage, most precise dimensioning of the equipment for treating these average flows, and a constant quantity of products and effluents.

Numerous processes have been proposed for carrying out continuous ion exchange.

Plant has been designed in which the resin is transported hydraulically or pneumatically. U.S. Pat. No. 2,815,332 describes a closed-circuit system in which the resin advances in countercurrent to the liquid. This loop contains four zones isolated by valves and dedicated respectively for saturation, rinsing, regeneration and rinsing. The resin advances through the zones and from one compartment to the next, in countercurrent to the liquid phase, under the action of hydraulic pulses. In such a system, the saturated resin layers are removed semi-continuously, i.e. by pulsation with a frequency of several minutes, and are replaced with freshly regenerated resin that is introduced on the side where the treated liquid leaves the fixation column. Rapid circulation of the resin reduces the total volume of resin employed. It is stated that it is possible, in particular, to use a single installation instead of two operating alternately. Evidently such systems are very difficult to implement.

Certain authors have developed a system called SMB (Simulated Moving Bed) for chromatography. Thus, U.S. Pat. No. 2,985,589 describes a continuous SMB chromatography process, in which the chromatography resin is fixed, distributed in several compartments, but its movement is simulated by the displacement at regular intervals of the position of the fluid inlets and outlets. The positions of the inlets (feed and eluent) and of the outlets (extract and raffinate) then define four zones. U.S. Pat. No. 6,375,851 describes a system with six zones, an adaptation to ion exchange of the process described previously in U.S. Pat. No. 2,985,589. The system described in document U.S. Pat. No. 6,375,851 is based on an SMB, except for the regeneration stage, which is implemented with displacement of the front. The fluid inlets and outlets are therefore shifted, in general simultaneously, synchronously after a sequence. The number of valves in these systems is prohibitive, which explains why these ionic SMB systems have never been implemented industrially, to the benefit of the AST solution, currently the only continuous ion exchange solution on the market.

Installations have also been designed in which the resin is placed in columns arranged as a turntable or carousel. A certain number of elementary columns corresponding to each phase of the ion exchange cycle, namely production, regeneration and the various rinsing stages, are arranged in a carousel. Such a system is described in FR-A-1546823. In this system, the columns of resins are placed on a rotating ring, the rotation of which is controlled by a timer, bringing each column successively to the various treatment phases. The columns are connected to a rotary distributor divided into as many cells as there are columns. The effluents are collected in a circular channel divided into as many sections as there are phases. Thus, each column passes successively through all the stages of the cycle. U.S. Pat. No. 4,522,726 describes a system suitable for ion exchange in which the cells containing the adsorbent are arranged in a carousel and are fed by a multi-way rotary valve distributing the fluids into the various compartments. The cells are presented successively in front of the ports of this valve, which is supplied continuously. It is this last-mentioned system that is used at present by the company AST in devices with 20 or 30 carousel-mounted columns. This system has several drawbacks. On the one hand, the carousel with the columns fitted is a complex system, as is the valve, the construction and maintenance of which are difficult. Moreover, the sequence time is determined by the smallest unit operation, each column undergoing a single operation during one sequence. Therefore a large number of columns is required, to take account of the differences in sequence time for each unit operation. Furthermore, as the unit operations are not of the same duration, to operate the carousel it is therefore necessary for certain unit operations to distribute fluid to 2 or 3 columns, which poses problems of hydraulic equilibrium. In fact, as it is impossible on cost grounds to fit control flowmeters on each pipe going to each column, it is not possible to ensure that the same amount of fluid flows effectively into each column. Moreover, there is no flexibility in this system. In addition, U.S. Pat. No. 5,156,736 describes a simulated moving bed in a single column, with at least two injection points, two collecting points and a recycling loop, for the separation of sugars.

In all these systems, the authors envisage perfect continuity of circulation of all the fluids. These systems lead to a very large number of columns, the size of the columns being defined by the smallest sequence in the series.

U.S. Pat. No. 6,280,623 describes a multi-cell system, each cell containing one or more stages with different solids. The principle of contact between the phases is the fluidized bed, in order to improve transfer of material and efficient utilization of the stationary phase. The technique described is not chromatography.

U.S. Pat. No. 6,245,238 describes a device for chromatography by low-pressure displacement for ion exchange, for pharmaceuticals, peptides, proteins, oligonucleotides and vaccines. The device makes it possible to connect several columns in series (during feed injection, the columns are refilled) and in parallel (after charging, the product contained in each column is discharged from all the columns at the same time).

For processes applied to biomolecules, and for example ion exchange or affinity processes, the production and regeneration stages are followed systematically by rinsing stages. In batch processes, the stages are most often carried out at the optimum flow rate with respect to the fixation or desorption kinetics. In continuous mode, this is not the case, and the optimum hydraulic conditions for each stage of the sequence are therefore not maintained in the continuous processes described above.

SUMMARY OF THE INVENTION

The applicant has developed a semi-continuous multicolumn sequential process applied to the purification of molecules and in particular biomolecules as defined in the present invention, which makes it possible to obtain results and yields that are much better than existing results, and on an industrial scale.

The processes according to the invention, as described in the claims, were elaborated on the basis of these findings.

The invention in particular provides a process for separating biomolecules from an aqueous solution containing said biomolecule and impurities, having different affinities and/or interactions with the solid support.

The invention therefore provides a process for separation on a solid support by multicolumn sequential selective retention for separating a product of interest from a solution containing said product of interest, by passing this solution over a fixed bed of chromatographic resin comprising at least three zones, means for flow of liquid being arranged between adjacent zones and between the last and the first zone, said process comprising several sequences, each sequence comprising at least one stage selected from an adsorption stage, a rinsing stage, a desorption stage, implemented simultaneously or not simultaneously, each subsequent sequence being carried out by the downstream displacement of the fronts in the zones by approximately the same increment before the periodical displacement of the introduction and withdrawal points, characterized in that the process includes a sub-sequence without feed injection.

The invention also provides a process for separation on a solid support by multicolumn sequential selective retention for separating a product of interest from a solution containing said product of interest, by passing this solution over a fixed bed of chromatographic resin comprising at least three zones, means for flow of liquid being arranged between adjacent zones and between the last and the first zone, said process comprising several sequences, each sequence comprising the stages of adsorption, of rinsing, and of desorption, implemented simultaneously or not, each subsequent sequence being carried out by downstream displacement of the fronts in the zones by approximately the same increment before the periodical displacement of the introduction and withdrawal points, characterized in that the process includes a sub-sequence without feed injection.

The invention also provides a process for separating a product of interest from a solution containing said product of interest and impurities, by passing this solution over a fixed bed of chromatographic resin comprising at least four zones in series, means for flow of liquid being arranged between adjacent zones and between the last and the first zones, said product of interest being selectively retained by contact with said chromatographic resin and at least one of the impurities being retained relatively less on this chromatographic resin than said product of interest, said chromatographic resin being regenerated by the action of a regenerating agent, characterized in that it comprises several sequences, each sequence including at least one of the following stages:

(a) introduction of a certain volume of a rinsing solution at the inlet of the first zone and approximately simultaneous withdrawal of the same volume of a liquid diluted with said product of interest, at a point situated downstream of this zone;

(b) introduction of a certain volume of said feed solution at the inlet of the second zone and approximately simultaneous withdrawal of the same volume of a liquid rich in the impurity or impurities that are retained relatively less, at a point situated downstream of this zone;

(c) introduction of a certain volume of a rinsing solution at the inlet of the third zone and approximately simultaneous withdrawal of the same volume of a liquid diluted with regenerating agent, at a point situated downstream of this zone;

(d) introduction of a certain volume of regenerating agent at the inlet of the fourth zone and approximately simultaneous withdrawal of the same volume of a diluted liquid, at a point situated downstream of this zone;

(e) introduction of a certain volume of an eluent at the inlet of the fifth zone and approximately simultaneous withdrawal of the same volume of a liquid rich in said product of interest, at a point situated downstream of this zone;

it being possible for stages (a), (b), (c), (d) and (e) to be implemented simultaneously or not simultaneously;

each subsequent sequence being carried out by periodical downstream displacement, by approximately the same volume increment, of the introduction and withdrawal points, and additionally comprising a stage (f) displacement of the fronts in at least zone (b) before the periodical displacement.

The invention also provides a process for separating a product of interest from a solution containing such a product of interest and impurities, by passing this solution over a fixed bed of chromatographic resin comprising at least four zones in series, means for flow of liquid being arranged between adjacent zones and between the last and the first zones, said product of interest being selectively retained by contact with said chromatographic resin and at least one of the impurities being retained relatively less on this chromatographic resin than said product of interest, said chromatographic resin being regenerated by the action of a regenerating agent, characterized in that it comprises several sequences, each sequence comprising at least one of the following stages:

(a) introduction of a certain volume of a rinsing solution at the inlet of the first zone and approximately simultaneous withdrawal of the same volume of a liquid diluted with said product of interest, at a point situated downstream of this zone;

(b) introduction of a certain volume of said feed solution at the inlet of the second zone and approximately simultaneous withdrawal of the same volume of a liquid rich in the impurity or impurities that are retained relatively less, at a point situated downstream of this zone;

(e) introduction of a certain volume of an eluent at the inlet of the third zone and approximately simultaneous withdrawal of the same volume of a liquid rich in said product of interest, at a point situated downstream of this zone;

it being possible for stages (a), (b) and (e) to be implemented simultaneously or not simultaneously;

each subsequent sequence being carried out by the periodical downstream displacement, by approximately the same volume increment, of the introduction and withdrawal points, and comprising moreover a stage (f) displacement of the fronts in at least zone (b) before the periodical displacement.

The invention also provides a process for separating a product of interest from a solution containing said product of interest and impurities, by passing this solution over a fixed bed of chromatographic resin comprising at least four zones in series, means for flow of liquid being arranged between adjacent zones and between the last and the first zones, said product of interest being selectively retained by contact with said chromatographic resin and at least one of the impurities being retained relatively less on this chromatographic resin than said product of interest, said chromatographic resin being regenerated by the action of a regenerating agent, characterized in that it comprises several sequences, each sequence comprising the following stages:

(a) introduction of a certain volume of a rinsing solution at the inlet of the first zone and approximately simultaneous withdrawal of the same volume of a liquid diluted with said product of interest, at a point situated downstream of this zone;

(b) introduction of a certain volume of said feed solution at the inlet of the second zone and approximately simultaneous withdrawal of the same volume of a liquid rich in the impurity or impurities that are retained relatively less, at a point situated downstream of this zone;

(c) introduction of a certain volume of a rinsing solution at the inlet of the third zone and approximately simultaneous withdrawal of the same volume of a liquid diluted with regenerating agent, at a point situated downstream of this zone;

(d) introduction of a certain volume of regenerating agent at the inlet of the fourth zone and approximately simultaneous withdrawal of the same volume of a diluted liquid, at a point situated downstream of this zone;

(e) introduction of a certain volume of an eluent at the inlet of the fifth zone and approximately simultaneous withdrawal of the same volume of a liquid rich in said product of interest, at a point situated downstream of this zone;

it being possible for stages (a), (b), (c), (d) and (e) to be implemented simultaneously or not simultaneously;

each subsequent sequence being carried out by the periodical downstream displacement, by approximately the same volume increment, of the introduction and withdrawal points, and comprising moreover a stage (f) displacement of the fronts in at least zone (b) before the periodical displacement.

The invention also provides a process for separating a product of interest from a solution containing said product of interest and impurities, by passing this solution over a fixed bed of chromatographic resin comprising at least four zones in series, means for flow of liquid being arranged between adjacent zones and between the last and the first zones, said product of interest being selectively retained by contact with said chromatographic resin and at least one of the impurities being retained relatively less on this chromatographic resin than said product of interest, said chromatographic resin being regenerated by the action of a regenerating agent, characterized in that it comprises several sequences, each sequence comprising at least one of the following stages:

(a) introduction of a certain volume of an equilibration solution at the inlet of the first zone and approximately simultaneous withdrawal of the same volume of a liquid composed firstly of regenerating solution and then of the equilibration solution, at a point situated downstream of this zone;

(b) introduction of a certain volume of the solution of feed to be treated containing the product of interest at the inlet of the second zone and approximately simultaneous withdrawal of the same volume of a liquid containing the impurity or impurities that are retained relatively less, at a point situated downstream of this zone;

(c) introduction of a certain volume of a rinsing solution at the inlet of the third zone and approximately simultaneous withdrawal of the same volume of a liquid diluted with the impurity or impurities that are retained relatively less than the product of interest, at a point situated downstream of this zone;

(d) introduction of a certain volume of eluting solution at the inlet of the fourth zone and approximately simultaneous withdrawal of the same volume of a liquid, containing the product of interest, at a point situated downstream of this zone;

(e) introduction of a certain volume of a regenerating solution at the inlet of the fifth zone and approximately simultaneous withdrawal of the same volume of a liquid containing the impurities that are retained most, at a point situated downstream of this zone;

it being possible for stages (a), (b), (c), (d) and (e) to be implemented simultaneously or not;

each subsequent sequence being carried out by the periodical downstream displacement, by approximately the same volume increment, of the introduction and withdrawal points, and comprising moreover a stage (f) displacement of the fronts in at least zone (c) before the periodical displacement.

The invention also provides a process for separating a product of interest from a solution containing such a product of interest and impurities, by passing this solution over a fixed bed of chromatographic resin comprising at least four zones in series, means for flow of liquid being arranged between adjacent zones and between the last and the first zones, said product of interest being selectively retained by contact with said chromatographic resin and at least one of the impurities being retained relatively less on this chromatographic resin than said product of interest, said chromatographic resin being regenerated by the action of a regenerating agent, characterized in that it comprises several sequences, each sequence comprising at least one of the following stages:

(b) introduction of a certain volume of the solution of feed to be treated containing the product of interest at the inlet of the first zone and approximately simultaneous withdrawal of the same volume of a liquid containing the impurity or impurities that are retained relatively less, at a point situated downstream of this zone;

(c) introduction of a certain volume of a rinsing solution at the inlet of the second zone and approximately simultaneous withdrawal of the same volume of a liquid diluted with the impurity or impurities that are retained relatively less than the product of interest, at a point situated downstream of this zone;

(e) introduction of a certain volume of a regenerating solution at the inlet of the third zone and approximately simultaneous withdrawal of the same volume of a liquid containing the impurities that are retained most, at a point situated downstream of this zone;

it being possible for stages (b), (c) and (e) to be implemented simultaneously or not simultaneously;

each subsequent sequence being carried out by the periodical downstream displacement, by approximately the same volume increment, of the introduction and withdrawal points, and comprising moreover a stage (f) displacement of the fronts in at least zone (c) before the periodical displacement.

According to one embodiment, stages (d) and (e) are carried out with the same fluid, these stages then corresponding to a stage consisting of:

(d) introduction of a certain volume of regenerating agent at the inlet of the fourth zone and approximately simultaneous withdrawal of the same volume of a liquid rich in said product of interest, at a point situated downstream of this zone;

the fourth and fifth zones then being merged into a single fourth zone.

According to one embodiment, stages (a), (b), (c) and (d) are implemented at least partly simultaneously.

According to one embodiment, said displacement of the fronts displaces the fronts synchronously in the different zones.

According to one embodiment, the displacement of the fronts comprises the following stages:

(i) creation of a circulation loop zone between the different zones, from the first zone to the fifth zone; and (ii) circulating in said loop to displace the fronts.

According to one embodiment, the displacement of the fronts comprises the following stages:

(i) creation of a first displacement zone by fluid connection from the outlet of the first zone to the inlet of the second zone and by fluid connection from the outlet of the second zone to the inlet of the third zone, and downstream displacement of the inlet of the first zone to provide the inlet of the first displacement zone and upstream displacement of the outlet of the third zone to provide the outlet of the first displacement zone; and creation of a second displacement zone by fluid connection from the outlet of the third zone to the inlet of the fourth zone and by fluid connection from the outlet of the fourth zone to the inlet of the fifth zone and fluid connection from the outlet of the fifth zone to the inlet of the first zone, and downstream displacement of the inlet of the third zone to provide the inlet of the second displacement zone and upstream displacement of the outlet of the first zone to provide the outlet of the second displacement zone; and (ii) introduction of a certain volume of rinsing solution at the inlet of the first displacement zone and approximately simultaneous withdrawal of the same volume of rinsing solution recovered at the outlet of the first displacement zone.

(iii) introduction of a certain volume of rinsing solution at the inlet of the second displacement zone and approximately simultaneous withdrawal of the same volume of rinsing solution recovered at the outlet of the second displacement zone.

According to one embodiment, said displacement of the fronts displaces the fronts asynchronously in the different zones.

According to one embodiment, the displacement of the fronts comprises the following stages:

(i) creation of a first zone of a first displacement by fluid connection from the outlet of the first zone to the inlet of the second zone and by fluid connection from the outlet of the second zone to the inlet of the third zone; and creation of a second zone of a first displacement by fluid connection from the outlet of the third zone to the inlet of the fourth zone and by fluid connection from the outlet of the fourth zone to the inlet of the fifth zone and by fluid connection from the outlet of the fifth zone to the inlet of the first zone; and (ii) introduction of a certain volume of said solution at the inlet of the first displacement zone and approximately simultaneous withdrawal of the same volume of a liquid diluted with regenerating agent at the outlet from the first zone of a first displacement;

(iii) introduction of a certain volume of regenerating agent at the inlet of the second displacement zone and approximately simultaneous withdrawal of the same volume of a liquid diluted with said product of interest at the outlet from the second zone of a first displacement;

(iv) creation of a first zone of a second displacement by fluid connection from the outlet of the first zone to the inlet of the second zone and by fluid connection from the outlet of the second zone to the inlet of the third zone, and downstream displacement of the inlet of the first zone to provide the inlet of the first zone of a second displacement and upstream displacement of the outlet of the third zone to provide the outlet of the first zone of a second displacement; and creation of a second zone of a second displacement by fluid connection from the outlet of the third zone to the inlet of the fourth zone and by fluid connection from the outlet of the fourth zone to the inlet of the fifth zone and fluid connection from the outlet of the fifth zone to the inlet of the first zone, and downstream displacement of the inlet of the third zone to provide the inlet of the second displacement zone and upstream displacement of the outlet of the first zone to provide the outlet of the second displacement zone; and (vi) introduction of a certain volume of rinsing solution at the inlet of the first zone of a second displacement and approximately simultaneous withdrawal of the same volume of a liquid rich in the impurity or impurities that are retained relatively less at the outlet from the first zone of a second displacement.

(vii) introduction of a certain volume of rinsing solution at the inlet of the second zone of a second displacement and approximately simultaneous withdrawal of the same volume of a liquid rich in said product of interest at the outlet from the second zone of a second displacement.

According to one embodiment, the first, second, third, fourth and fifth zones comprise at least one column, preferably at least two columns.

According to one embodiment, stage (f) comprises a displacement of the fronts in all the zones before the periodical displacement.

According to one embodiment, the periodical displacement of the injection points is carried out from one zone to one zone.

According to one embodiment, the periodical displacement of the injection points is carried out from one column to one column.

According to one embodiment, the periodical displacement of the injection points is carried out from two columns to two columns.

According to one embodiment, said zones comprise at least one column, preferably at least two columns.

According to one embodiment, the volume increment according to which said points of introduction and said points of withdrawal are displaced corresponds approximately to the volume of an entire fraction of a zone of absorbent material.

According to one embodiment, the volume increment according to which said points of introduction and said points of withdrawal are displaced corresponds approximately to the volume of a column.

According to one embodiment, the columns are equipped with multi-way valves.

According to one embodiment, the periodical displacement of the stages is synchronous.

According to one embodiment, the periodical displacement of the stages is asynchronous.

According to one embodiment, said liquid diluted with said product of interest is sent at least partly to stage (b).

According to one embodiment, there is a supplementary zone, and the process additionally comprises a stage (g) of introduction of all or part of the liquid diluted with said product of interest obtained in stage (a) at the level of said supplementary zone, and recovery of approximately the same volume of rinsing solution at a point situated downstream of this zone.

According to one embodiment, stage (b) comprises two substages (b1) and (b2), as well as an intermediate stage of adjustment of a parameter of the solution, in particular by altering the pH.

According to one embodiment, said liquid diluted with regenerating agent obtained in stage (c) is sent at least partly to stage (d), optionally after being topped up.

According to one embodiment, the recovered rinsing solutions are sent at least partly to stages (a) and/or (c).

According to one embodiment, the chromatography is an ion exchange chromatography and the product of interest is an amino acid, preferably lysine.

According to one embodiment, the chromatography is an ion exchange chromatography and the product of interest is insulin.

According to one embodiment, the chromatography is an affinity chromatography and the product of interest is IgG.

According to one embodiment, the chromatography is an affinity chromatography and the product of interest is a protein or a biomolecule.

Preferably, the solvent (or buffer) of the rinsing solution is different from the solvent (or buffer) of the desorption solution (pH, composition, eluting power etc.); preferably, the solvent (or buffer) of the rinsing solution is the same as the solvent (or buffer) for adsorption (pH, composition, eluting power etc.).

Figure 1:
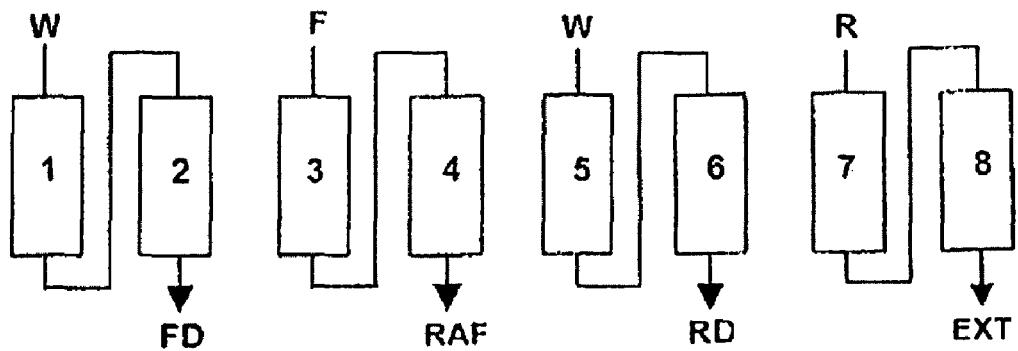
FIG. 1 is a diagrammatic representation of an SMB embodiment according to the prior art.
Figure 1:
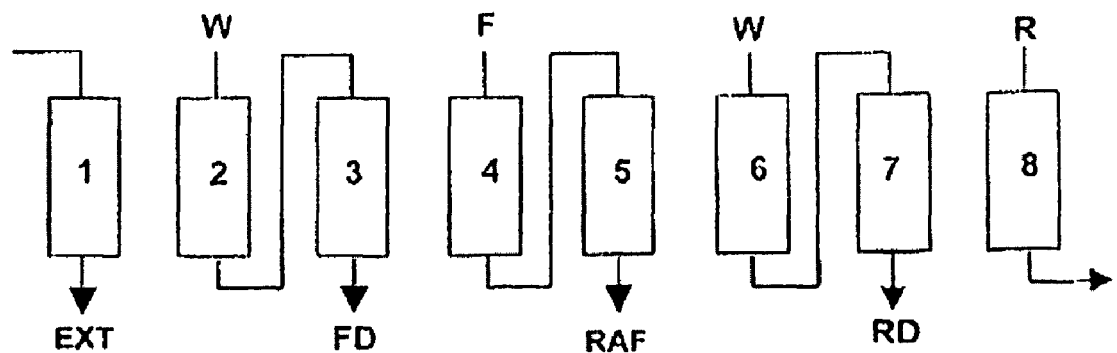

The following symbols are used in these figures:
W water
FD diluted lysine
F aqueous lysine solution—feed solution or "feed" containing a molecule of interest (for example lysine, insulin, human IgG)
RAF raffinate
RD diluted regenerating solution
R regenerating agent
EXT extract
Lysine displ displacement of lysine
Ads adsorption
Pre ads pre-adsorption
Water displ. displacement with water (rinsing)
Water -
$NH_3$ displ. displacement with water (regeneration)
Spare -
Wash washing
Rege regeneration
Wash neutral neutral washing
Acidified water -
Waste effluent

DETAILED DESCRIPTION OF EMBODIMENTS OF THE INVENTION

According to the present invention, "biomolecules" means all molecules isolated and purified from a biological material, including, without being limiting, amino acids, proteins, peptides, hormones, antibiotics, antibodies, enzymes, components of the cell membrane such as phospholipids etc. as well as their recombinant forms or forms labelled with hot or cold fluorescent labels well known to a person skilled in the art.

According to the invention, the molecule of interest can be the molecule that is retained most by the stationary phase but also the molecule retained least by the stationary phase. As an example it may be mentioned that when the adsorption process according to the invention is used for the separation of endotoxins, the toxins are the molecules retained most by the stationary phase and the molecule of interest is retained least.

According to the present invention, by "adsorption stage" is meant a stage in the course of which feed containing the molecule to be separated is injected; one or more of the products contained in the feed will then become attached to the solid phase. This stage corresponds to charging of the phase.

According to the present invention, by "desorption stage" is meant a stage in the course of which the product or products that are fixed on the solid support pass into the liquid phase. An adsorption process therefore naturally comprises at least one adsorption stage and at least one desorption stage.

According to the present invention, by "rinsing stage" is meant a stage between an adsorption stage and a desorption or reversal stage permitting renewal of the liquid phase contained in the column or columns. The designation "washing stage" may also correspond to this stage.

The process of the invention permits a better optimization of the sequences of feed of the aqueous solution to be treated and rinsing of the separated products; this leads to a reduction in the volumes used and to less production of by-products.

Moreover, the process according to the invention also offers one or more of the following advantages:
 mechanical design that makes it possible to avoid moving parts, since the columns are fixed, and the carousel is no longer required. The columns are compact and it is possible to use multi-way valves on each column.
 simplified maintenance, since a column can be separated from the cycle without having to stop the process, for changing the chromatographic resin or support, general maintenance, etc. The maintenance requirements are close to those of a discontinuous process, which are known to be relatively low.
 process control is simple, since it is sufficient to change the parameters of the automatic system in order to modify the process and adjust the process zones (no mechanical component has to be changed). Furthermore, it is possible to use a flowmeter on each column, for each process stage.
 expansion of capacity is easy to implement, simply by adding columns to the existing columns and by modifying the process parameters in order to modify the zones.
 the required floor space is also less than with a system of the prior art using a carousel.

These advantages, as well as others, will be explained as appropriate in the description that follows.

For FIGS. 1, 3 to 6, the description is given with reference to a specific amino acid, lysine, but it is understood that the process according to the invention applies to all the amino acids and more generally to all the biomolecules according to the invention, and applies to any type of chromatography well known to a person skilled in the art.

It will be recalled that the biomolecule is regarded, for ion exchange, as the extract (X) as it is exchanged more and that the impurities that are exchanged less are regarded as a raffinate (R). In the invention, the purity in the extract is for example greater than 95%, preferably greater than 98%, advantageously greater than 99%. The same conventions will be used as for the other examples in the present application, the term "more retained" or "less retained" being used when there is no ion exchange.

The ion exchange resins are conventional, as are the rinsing solutions and regenerating solutions. For example, the resins according to the invention can be selected from the affinity, ionic, normal or reversed phase resins, with hydrophobic interaction, size-exclusion, etc. From this standpoint, the invention does not differ from the prior art for ion exchange. It is possible to use weak or strong, anionic or cationic resins, depending on the case to be treated.

It is also possible to use several systems in series; in particular a demineralization can be carried out using a first system with cationic resins followed by a second system with anionic resins.

It should be noted that when the biomolecule is an amino acid such as lysine, the aqueous solution can be the culture broth obtained by fermentation producing said amino acid. Water is then used as eluent in the invention. It is in fact possible to use a culture broth as starting product for any type of separation, by adapting the resins in the columns.

Said aqueous solution containing the biomolecule can be obtained by clarification of the culture broth, and said clarification can comprise centrifugation and/or membrane filtration, preferably membrane filtration.

Figure 3:
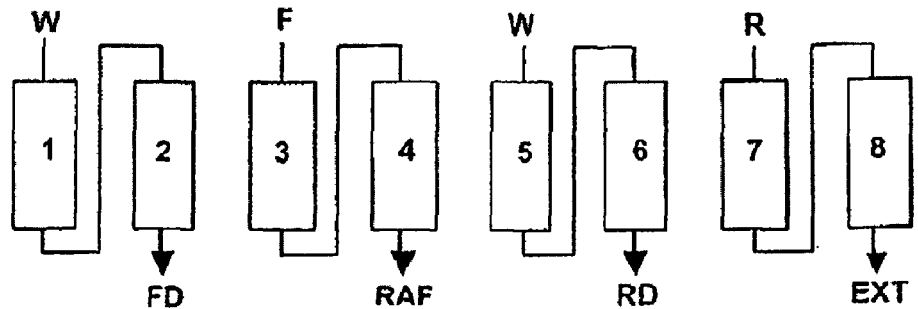
FIG. 3 is a diagrammatic representation of a first embodiment.
Figure 3:
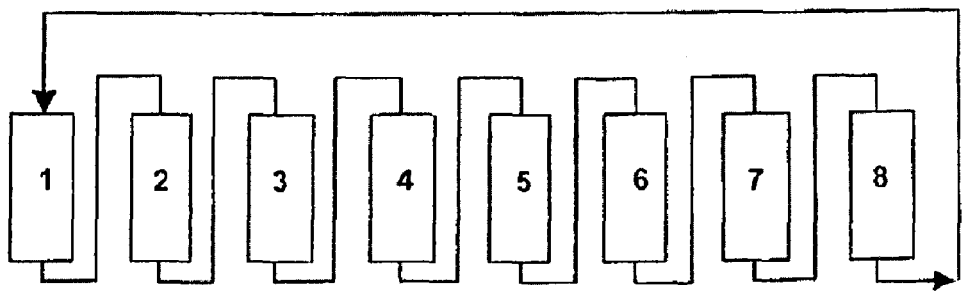
Figure 3:
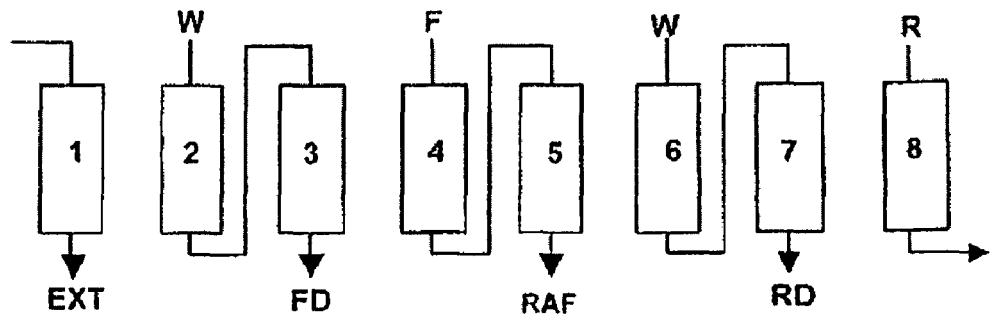
Figure 3:
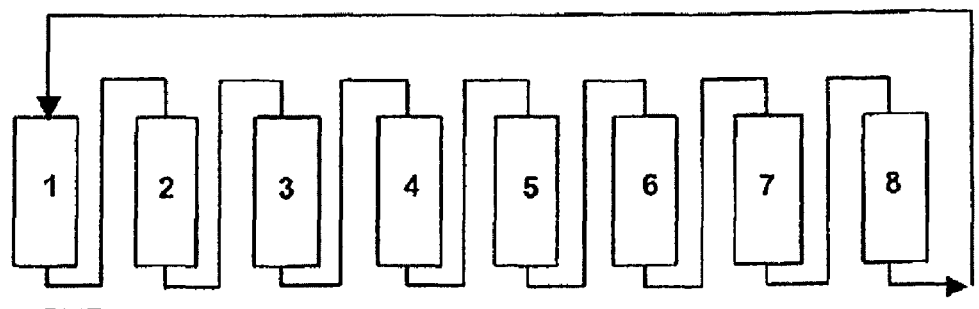
Figure 4:
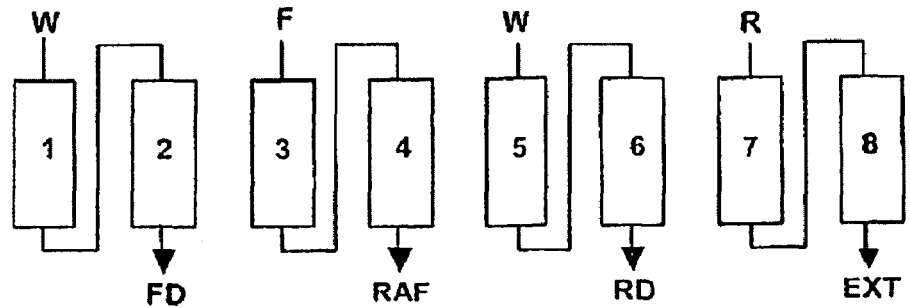
FIG. 4 is a diagrammatic representation of a second embodiment.
Figure 4:
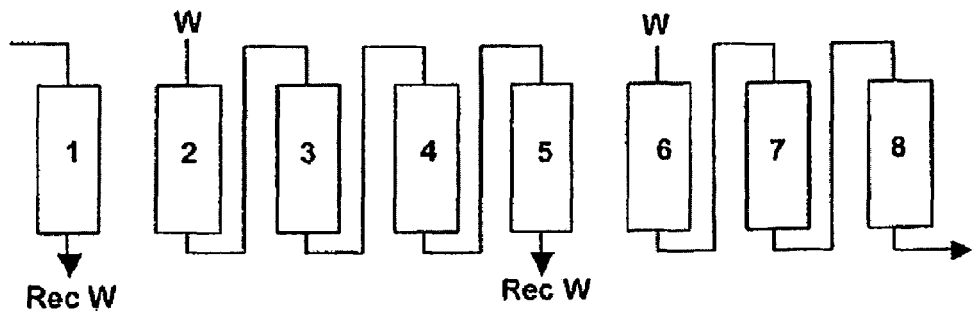
Figure 4:
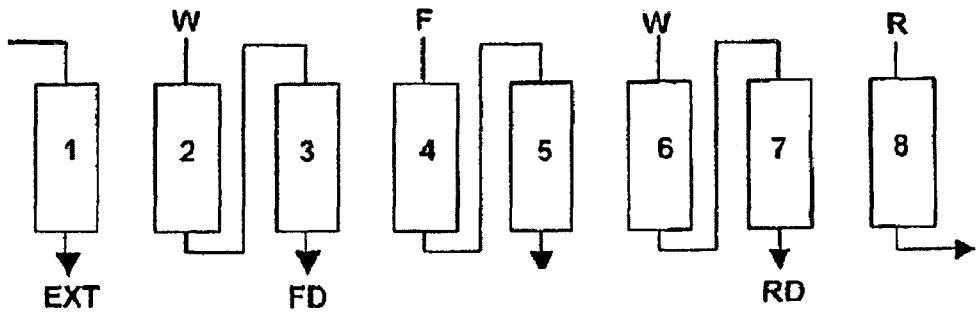
Figure 4:
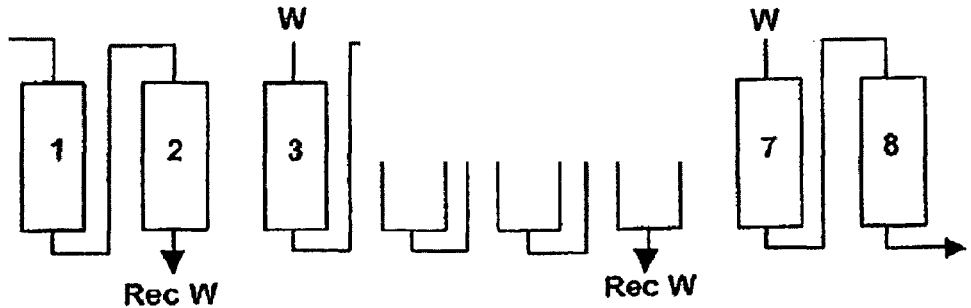
Figure 5:
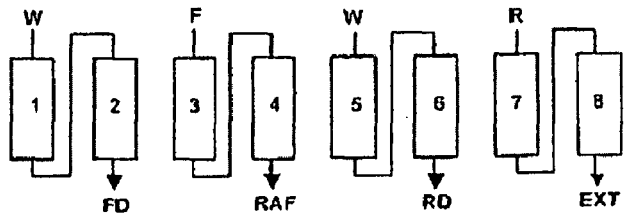
FIG. 5 is a diagrammatic representation of a third embodiment.
Figure 5:
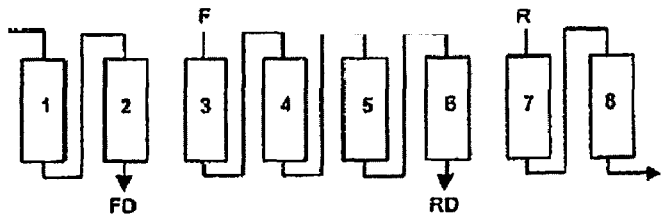
Figure 5:
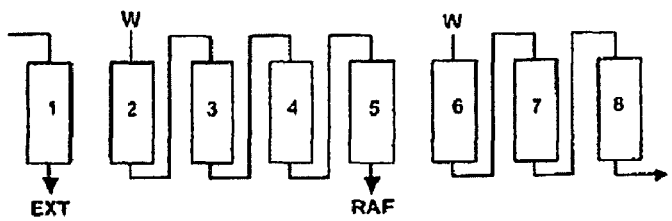
Figure 5:
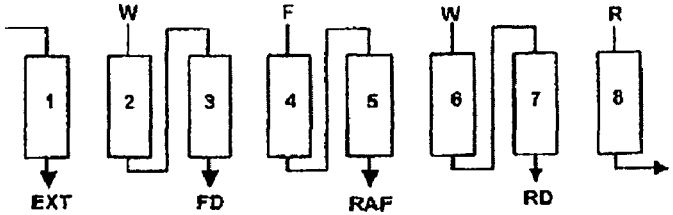
Figure 5:
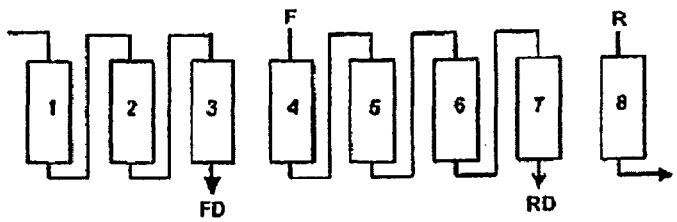
Figure 5:
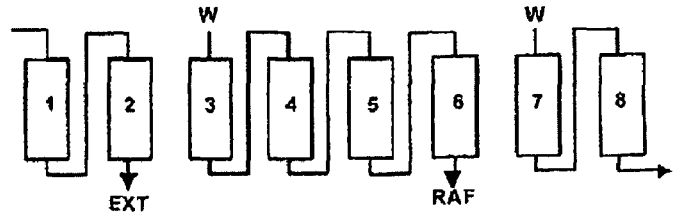

The present invention is illustrated as an example by the following description of three embodiments, referring to FIGS. 3 to 5 of the attached drawings, whereas FIG. 1 describes an embodiment according to the prior art. Lysine is taken as a representative example of an amino acid, itself representative of a substance to be purified in an ion exchange chromatography process, the latter being representative of a generic chromatography process to which the invention applies.

Referring to FIG. 1, the installation comprises eight columns 1, 2, 3, 4, 5, 6, 7 and 8 packed with ion exchange resin. The operation of this installation of the SMB type according to the prior art is explained below. It has to be borne in mind that the displacement stages go from left to right, which in fact corresponds to displacement of the columns from right to left.

Stage (a) comprises the steps for introducing a certain volume of water W into the inlet of column 1 and approximately simultaneously withdrawing the same volume of diluted lysine from the outlet of column 2, with columns 1 and 2 forming the first zone. During introduction of water, right at the start of the stage, it should be borne in mind that owing to the displacement, column 1 is therefore in fact column 2 just previously (before the displacement). Column 2 just previously is filled with the diluted lysine solution (that which has not been fixed by ion exchange). The front of pure water therefore moves downwards, and column 1 therefore passes from a "diluted lysine" state (it being understood that there is exchanged lysine in this column) to a "water" state (with exchanged lysine in this column). Column 2, which was column 3 just previously, passes from a "lysine" state (with fixed exchanged lysine) to a "diluted lysine" state (with fixed exchanged lysine), and lysine solution to be purified is recovered in the diluted state at the bottom of column 2, relatively concentrated at first, then more and more dilute. In fact no more exchange sites are available in this column and therefore the dilute solution is simply eluted along this column; this is a displacement of lysine solution. This recovered dilute solution is typically returned to the starting tank of the solution to be purified, or else directly to the head of column 3.

Stage (b) comprises the steps for introduction of a certain volume of said aqueous solution into the inlet of column 3 and approximately simultaneous withdrawal of the same volume of a liquid rich in raffinate from the outlet of column 4. Column 3 is fed with lysine solution, but this column corresponds to column 4 immediately before, therefore to a column already partially exchanged with lysine, and also containing diluted lysine that has not been exchanged. Similarly, column 4 corresponds to column 5, but immediately previously and therefore a column with water. Column 4 is a preadsorption column since it receives spent lysine solution from column 3. In column 3, the lysine solution is injected and a saturation front advances in column 3, whereas the front of the lysine solution to be purified and which is exchanged on the sites advances in column 4 (preadsorption column). At the outlet of column 4, the raffinate is recovered, i.e. the elements of the solution to be treated that have not been exchanged with the resin, starting from a very dilute solution to a solution more concentrated with raffinate.

Stage (c) comprises the steps for introduction of a certain volume of water at the inlet of column 5 and approximately simultaneous withdrawal of the same volume of a liquid diluted with regenerating agent from the outlet of column 6. Column 5 is fed with water, whereas dilute regenerating agent leaves from column 6. In fact, column 6 is column 7 just before the displacement and therefore just after the displacement it receives what leaves column 5, namely water with a small amount of regenerating agent. What leaves column 6 is therefore dilute regenerating agent.

Stage (d) comprises the steps for introduction of a certain volume of regenerating agent into the inlet of column 7 and approximately simultaneous withdrawal of the same volume of a liquid rich in the amino acid from the outlet of column 8. Column 7 is fed with regenerating agent, and is connected to column 8. This column 8 is column 1 just before the displacement and therefore just after the displacement column 8 is fed with regenerating agent, with the result that the regenerating agent front agent advances in column 8, and the extract is then recovered at the bottom of column 8, dilute at first and then more and more concentrated and when the amount recovered begins to decrease, the stages are displaced.

At the end of a given sequence N, at the head of column 1 there is therefore water and exchanged lysine fixed on the resin. At the head of column 2 there is exchanged lysine, water and a residue of lysine solution to be purified. At the head of column 3 there is completely exchanged lysine, with lysine solution to be purified. At the head of column 4, there is partially exchanged lysine (not all the sites are exchanged) and raffinate (portion of the lysine solution to be purified that has not been fixed) and a residue of lysine solution to be purified. At the head of column 5, there are rinsing water and the sites of the resin that are ready to be exchanged. At the head of column 6, there is rinsing water diluted with regenerating agent, with the sites being regenerated. At the head of column 7, there are the fully regenerated sites (ready to exchange lysine) and regenerating solution. At the head of column 8, there are partially regenerated sites and diluted regenerating solution and extract (partially).

Therefore right at the start of the next sequence N+1, and with reference to a scheme in which the columns are displaced towards the left by displacement of the injection and withdrawal points towards the right, the positions are then as follows. Water is sent to column 2, which at its head has exchanged lysine, water and a residue of lysine solution to be purified. At the head of column 3 there is fully exchanged lysine, with lysine solution to be purified, which will then receive what leaves column 2. At the head of column 4, there is partially exchanged lysine (not all the sites are exchanged) and raffinate (portion of the lysine solution to be purified that has not been fixed) and a residue of lysine solution to be purified, and this column then receives the lysine solution to be purified. At the head of column 5, there are the rinsing water and the sites of the resin ready to be exchanged, and it receives what leaves column 4, namely raffinate and depleted lysine solution which will be exchanged on this preadsorption column. At the head of column 6, rinsing water is fed to a column having regenerated sites, and containing dilute solution of regenerating agent. Column 7, which also has fully regenerated sites (ready to exchange lysine), then receives water from column 6 and diluted regenerating solution which is withdrawn at the bottom. At the head of column 8, there are partially regenerated sites and diluted regenerating solution, and a solution of regenerating agent is supplied.

The flows that will arrive at the head of the columns will therefore be as follows. At the head of column 2 the solution to be purified arrives on a column already having partially exchanged lysine at its head. There is therefore a breakdown of the fronts and a gradient that is not respected. At the head of column 8 the regenerating solution arrives on a column partially regenerated with dilute regenerating agent, and therefore there is, locally, mixing of pure regenerating agent with impure regenerating agent. Once again, the gradient is not respected.

We therefore see that the conventional SMB system, applied in the field of ion exchange resins, although having the advantage of being continuous, is not free from problems, which are especially marked in regeneration.

Owing to a stage of displacement of the fronts in the zones before the periodical displacement, the invention makes it possible to overcome this problem and respect the gradients. The stage of displacement of the fronts is carried out typically for one column. The description that follows makes reference to three embodiments. Displacement of the fronts is carried out by injection of a selected fluid into the columns, either the existing fluids by circulation in a closed loop, by injection of water (the rinsing liquid) or by injection of feed and of regenerating agent followed by injection of water.

In FIGS. 3, 4 and 5, the installation is identical in terms of columns, only differing in the operating mode of the columns, and the possible presence of intermediate tanks (not shown).

The installation comprises columns (1, 2, 3, 4, 5, 6, 7 and 8) packed with the same amount of an ion exchange resin, for example strong cationic resins of the polystyrene type (for example with 4-10% of divinyl benzene, advantageously approximately 8%), such as the resins DIAONS SK1 B from Mitsubishi, DOWEX 600 B from Dow, or FPC 11-Na from Rohm & Haas.

These columns are arranged in series, each comprising an inlet and an outlet. In general, as will be seen later, each inlet can receive the aqueous solution to be treated, the regenerating solution, water, recovered water, acidified lysine, and ammonia. In general, as will be seen later, each outlet can produce the diluted lysine, raffinate, extract, recovered water, dilute ammonia, and lysine (extract). Each column is, moreover, connected to the column upstream and downstream.

Figure 2:
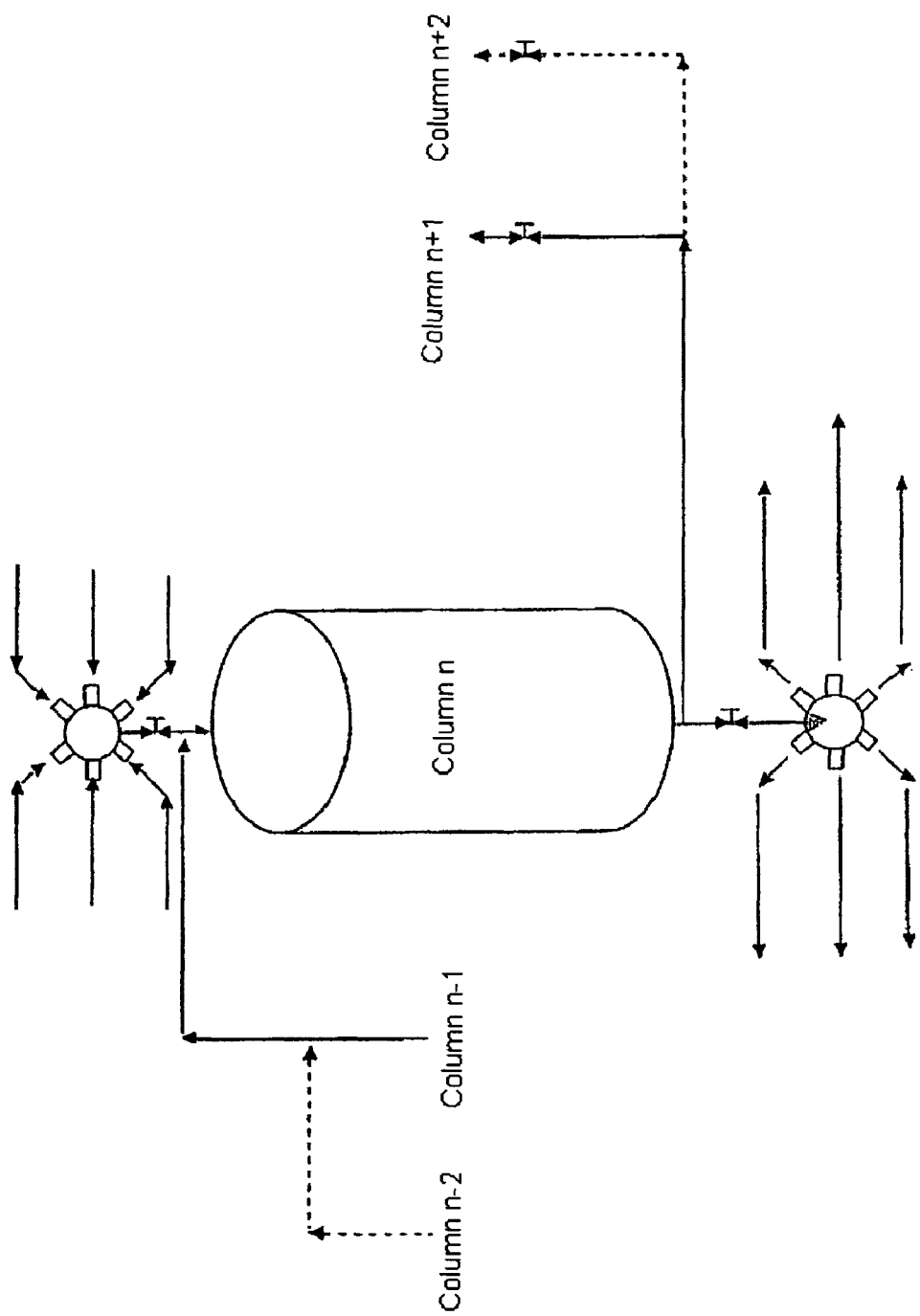
FIG. 2 is a diagrammatic representation of a column in its environment in an installation according to one embodiment of the invention.

This principle is shown in FIG. 2. As shown in FIG. 2, the valves can be multi-way valves, in particular 6-way. These multi-way valves are known per se, and are operated conventionally by an electric motor. Advantageously, the valves are actuated to turn by an increment each time in an operating mode. For certain operating modes, the valves can be actuated to turn by several sectors, for example when a column is to be isolated to carry out a specific sequence on said column.

With reference to the first embodiment shown in FIG. 3, after sequence N, identified as sequence 1.1 in the diagram, there is the arrangement described above with reference to the SMB system.

Then a displacement of the fronts is carried out during sequence 1.2. This displacement is obtained by putting the columns in a loop and by circulation.

This displacement is carried out by an increment of one column, by circulating the fluids in the loop. The volume displaced corresponds to the volume of a column.

Thus, at the start of sequence N+1 the following columns are obtained. Column 4 therefore has, at its head, partially exchanged sites and in terms of fluid, what was at the head of column 3 (the sites already exchanged do not change), therefore lysine solution to be purified (therefore a composition approximately identical to what the column will receive next). Column 8 then has partially regenerated sites and solution of regenerating agent (therefore a composition approximately identical to what the column will receive next). Thus, the columns are fed with a constant gradient, since the concentrations do not change at the head of these columns. This is also true for the other columns. Column 6 has, at its head, what was at the head of column 5, namely water, and will also receive water. Column 2 has, at its head, what was at the head of column 1, namely water, and will also receive water.

Referring to the second embodiment shown in FIG. 3, after sequence N, identified as sequence 1.1 in the diagram, there is the arrangement described above with reference to the SMB system.

A displacement of the fronts is then carried out during sequence 1.2. This displacement is obtained by circulating two displacement zones. The first displacement zone is the zone comprising columns 2, 3, 4 and 5. The second displacement zone is the zone comprising columns 6, 7, 8 and 1.

This displacement is carried out by an increment of one column, by injection of water at the head of the displacement zones. The volume displaced corresponds to the volume of a column.

Therefore at the start of the sequence N+1 the columns are obtained as in the first embodiment. The difference comes from the displacement of a column volume of water. In fact, between the two parts of the production/regeneration process, there is a buffer of water to prevent contamination of the different species. This buffer of water is simply displaced in the first embodiment, whereas it is replaced in the second embodiment. In the second embodiment, we then recover, at the bottom of columns 1 and 5, the volume of water in a column, therefore recovered water (Rec W). This recovered water is sent to an intermediate tank, and can be used for feeding the columns with rinsing water. This water can also be used partly with fresh water for rinsing. The other sequences are those as in the first embodiment.

In the first and second embodiments, the displacement of the fronts is synchronous, since all the fronts move at the same time by a volume increment. The entering fronts are displaced synchronously with the leaving fronts.

In the first and second embodiments, the sub-sequence without feed injection corresponds to sub-sequence 1.2 (or 2.2, depending on the sequence considered).

Referring to the third embodiment shown in FIG. 5, after sequence N, identified as sequence 1.1 in the diagram, the arrangement is as described above with reference to the SMB system.

Then a first displacement of the fronts is carried out during sequence 1.2. This first displacement is obtained by circulating two zones of first displacement. The first zone of first displacement is the zone comprising columns 3, 4, 5 and 6. The second zone of first displacement is the zone comprising columns 7, 8, 1 and 2. Lysine solution is injected into column 3, which causes a first displacement in the first zone. At the head of column 4 there is then lysine solution to be purified. The contents of column 6 are recovered at the bottom; it is dilute regenerating agent. Regenerating agent is injected into column 7, which causes a first displacement in the second zone. At the head of column 8 there is then solution of regenerating agent.

A second displacement of the fronts is then carried out during sequence 1.3. This second displacement is obtained by circulating two zones of second displacement. The first zone of second displacement is the zone comprising columns 2, 3, 4 and 5. The second zone of second displacement is the zone comprising columns 6, 7, 8 and 1. This time water is injected into columns 2 and 6. This then causes a second displacement of the fronts. The composition of the head of column 3 is now at the head of column 4; once again it is lysine solution to be purified. From this standpoint, the composition of the head of column 4 has not changed in the course of this second displacement. Similarly, at column 8 we obtain the composition of the head of column 7, namely regenerating agent. Again from this standpoint, the composition of the head of column 8 has not changed. What has changed in the course of this second displacement are the compositions in columns 5 and 1, since raffinate was obtained at the bottom of column 5 and extract at the bottom of column 1. During this second displacement, the "buffer" of water between the two parts of the production/regeneration process was reconstituted to prevent contamination of the different species.

In the third embodiment, the displacement of the fronts is asynchronous, since all the entering fronts are not displaced synchronously with the leaving fronts. In the example, the entering fronts are displaced first, then the leaving fronts are displaced, but it is also possible to do the reverse.

In the third embodiment, the sub-sequence without feed injection corresponds to sub-sequence 1.3 (or 2.3, depending on the sequence considered).

The number of columns in a displacement zone or in a zone corresponding to the zones (a), (b), (c) and (d) is not necessarily constant. A change in the number of columns in each zone can be beneficial for maximum utilization of each column. As an example, it is possible to have a first set of columns in elution (displacement columns), the number of which is constant, whereas the zones of production and of regeneration have variable lengths, for example two columns in production and one column in regeneration, then one column in production and two columns in regeneration. As another example, if a set of M columns is considered, there can be a complete sequence (set of all the sequences (a), (b), (c), (d) and of displacement) on M−1 or M−2 columns or M−m columns. It is then possible to isolate one, two or m columns, for example for maintenance, on the bed of resin or on the valve and pipe assemblies attached to said column.

In fact, the process according to the invention makes it possible to implement a selected stage on a selected column, independently of the other columns, if need be. This is impossible with the continuous processes of the prior art. For example, as stated, it is possible to isolate a column. It is also possible, within a given sequence, to change the feed of a column. When a column receives water, recovered water can be used in a first phase, and then fresh water can be sent to this column, which makes it possible to optimize the water consumption. It is also possible to feed a column with variable feeds or variable regenerating solutions. Relative to the processes according to the prior art, it is possible to exercise better control on the rinsing and production flows. In particular, these processes of the prior art envisage continuous dilution of the feed with rinsing water. This leads inter alia to an increase in the speed of passage through the adsorption zone (ion exchange). The optimum hydraulic conditions for each stage of the sequence are therefore not respected in the continuous processes of the prior art. The invention makes it possible to benefit most from the optimum hydraulic conditions, by managing each stage optimally, since stages (a), (b), (c) and (d) are not necessarily of the same duration. The flows are therefore optimized in each column. Moreover, it is possible to use flowmeters on each column, since the number of columns is reduced relative to a carousel with 20 or 30 columns as in the case of the prior art of AST. With a flowmeter at the head of each column, it becomes possible to optimize the hydraulic conditions in the column in question.

In the case of lysine, the process can be optimized to obtain optimized column feed fluids, by topping up the fluids leaving the columns for reuse in the next columns. Thus, during sequence 1.1 in the diagrams, the following procedure can be followed. The solution leaving column 3, which contains unfixed lysine and exchanged ammonium ions, is advantageously reacidified with sulphuric acid, to have a neutral medium during feed of column 4. Ammonium sulphate is then obtained in the raffinate. The dilute lysine solution leaving column 2 can be sent to the head of column 3 and/or can be combined with the flow leaving this column and the neutralizing acid. The solution leaving column 6, which contains dilute regenerating agent, can be topped up with ammonia to be returned to the head of column 7 as regenerating agent. An extract is then obtained which is lysine and a raffinate which contains ammonium sulphate.

Figure 6:
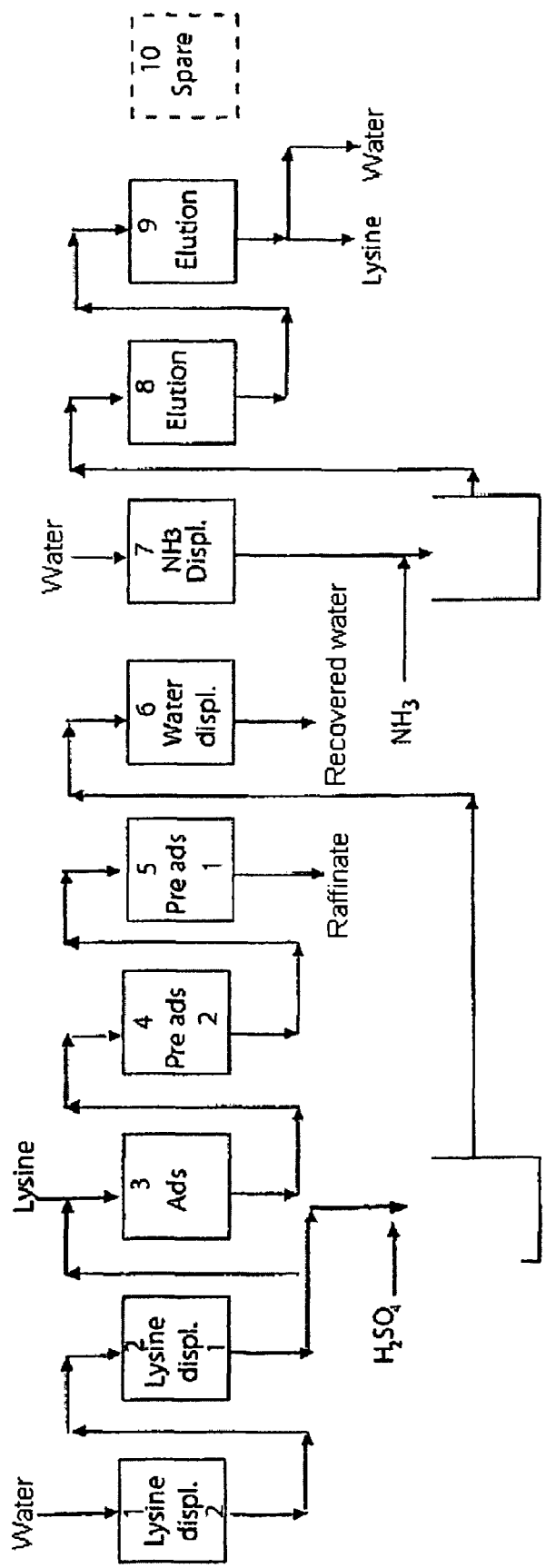
FIG. 6 is a diagrammatic representation of a fourth embodiment.

It is also possible to have other displacement columns, in particular a supplementary displacement column in stage (b), and thus have a supplementary stage of production of recovered water. This embodiment is shown in FIG. 6, which comprises the use of 9 columns. Columns 1 and 2 and 3 correspond to columns 1 and 2 and 3 in FIGS. 3, 4 and 5. Columns 4 and 5 correspond to column 4 in FIGS. 3, 4, 5. Column 6 is new relative to the embodiments of FIGS. 3, 4 and 5. Column 7 corresponds to columns 5 and 6 in FIGS. 3, 4, 5. Columns 8 and 9 correspond to columns 7 and 8 in FIGS. 3, 4 and 5. The operating mode is identical to that for the embodiments of FIGS. 3, 4 and 5. Circulation is applied identically here. Similarly, it is possible to define two displacement zones according to the second embodiment as follows: the first displacement zone comprises columns 2 to 7 and the second displacement zone comprises columns 8, 9 and 1. It is also possible to define zones of first and second displacements according to the third embodiment. The first and second zones of first displacement comprise columns 3 to 7 on the one hand and 8 to 2 on the other hand. The first and second zones of second displacement comprise columns 2 to 7 on the one hand and 8, 9 and 1 on the other hand. In the embodiment of FIG. 6 the flow leaving column 3 feeds column 4 directly, but it would also be possible to reacidify it to neutralize the effluent. In the embodiment of FIG. 6 (just as for the other embodiments), it is possible to adjust the pH of the different fractions that are sent to the columns. For example, it is possible to ensure that the pH of the fraction that has been in contact with the most charged column (here 3) is below 2 before it is sent to the next column. By changing the pH, it is also possible to vary the type of lysine fixed preferentially on the resin (monovalent or non-monovalent lysine).

The invention also applies to any type of separation by chromatography on any type of product. In particular, the process according to the invention can use 5 inlet fluids (or more):

Feed Fluid or Feed: this liquid contains the feed to be treated and its pH buffer composition, salinity making it possible, by injecting this fluid in a column, to adsorb the molecule of interest on the stationary phase. At the end of the feeding stage, the column contains a stationary phase on which the component of interest is adsorbed, whereas the liquid phase located in the column is constituted by the diluted feed fluid (FD, Feed Diluted).

Rinsing fluid, with salinity and pH identical to the feed fluid, but not containing feed to be treated. This stage renews the liquid phase of the column and makes it possible to remove the compounds of the feed that are not retained by the stationary phase. In the case of lysine, for example, water or an aqueous acid is used.

Elution of the desired species: a fluid of a nature modifying the nature of the interactions between the target molecule and the stationary phase makes it possible for the target molecule to be desorbed from the stationary phase, the target molecule then being collected from the outgoing liquid.

Regeneration: after elution, impurities may remain strongly adsorbed on the stationary phase, and may have an adverse effect on its stability or hygienic character. A fluid containing additives such as soda or urea can thus be used. In the case of lysine, described previously, the stages of elution of the desired species and of regeneration are implemented simultaneously, the regenerating agent (ammonia) exchanging the sites of the resin to release the lysine.

Injection of a solvent corresponding to the rinsing fluid used after feeding makes it possible to clear the column of the regenerating solvent or solvents before carrying out the next feed. A buffer is thus maintained between feeding and the end of regeneration; this is called equilibration.

The invention offers a process that makes it possible to implement the following 5 stages:

Stage a: called equilibration, in the course of which the equilibration solution is injected into at least one column of the system to clear it of the regenerating solvent that it contains. Downstream of the equilibration zone, the fluid withdrawn will initially be composed predominantly of the regenerating solution, then predominantly of the equilibration solution.

Stage b: called feeding, in the course of which the solution of feed to be treated is injected. The molecule of interest is then fixed on the chromatographic support with other impurities. At the outlet from this zone, downstream of the injection point, the fluid withdrawn then contains the impurities that are retained least.

Stage c: called washing, in the course of which washing of the column is carried out, replacing the liquid phase in particular containing impurities not retained by the washing solvent.

Stage d: called elution, in the course of which a solution is injected, modifying the interactions of the molecule of interest with the chromatographic support, thus permitting the molecule of interest to be eluted. At the outlet from the elution zone, the fluid withdrawn will first contain the washing solution, then a solution rich in the product of interest.

Stage e: called regeneration, in the course of which a regenerating solution is injected, making it possible to detach the impurities that are very strongly adsorbed on the support.

In the invention, the periodical displacement of the injection points can be carried out from one column to one column; thus, each column (or zone) can be managed independently. This variant differs in particular from the carousel systems of the AST type, since in these systems all the columns are necessarily switched together. The invention makes it possible to operate each column (or zone) independently; in particular the displacement of the injection/withdrawal points can be synchronous, asynchronous, and similarly the stage of displacement of the fronts can be synchronous or asynchronous, and can be applied column by column (or zone by zone). It is also possible to operate with one column (or zone) for one operation or with several columns (or zones) for other operations; thus it is possible to displace the injection/withdrawal points and the fronts of one column for one given zone and of two or several columns for another given zone.

The invention also applies in the case of a process using 5 fluids or more, as stated above, and is applicable to biomolecules or other molecules of high added value, such as medicaments. In the case of biomolecules, in general there is no interest in the outgoing fluids, which do not contain the molecule of interest, as the cost of the biomolecule means that optimized stages are unnecessary. In the case of a biomolecule, in contrast, it is essential to recover the maximum amount of said biomolecule. This principle is illustrated in particular in the following description.

In the chromatographic adsorption processes, the rate at which the molecule of interest fixes to the stationary phase is slow. To the extent that a column of volume V is fed continuously, the product leaves the column whereas the stationary phase is not completely saturated by the target molecule. This limited adsorption is illustrated in FIG. 7.

Figure 7:
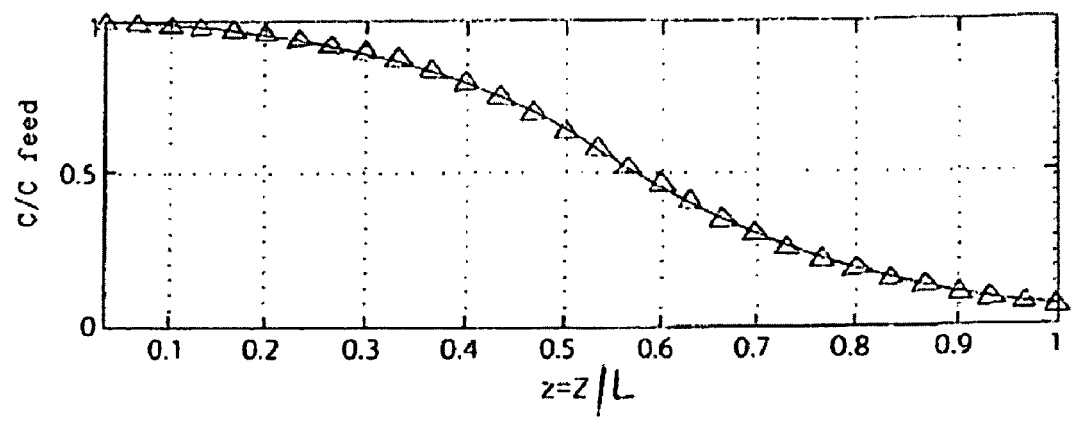
FIG. 7 illustrates an example of partial charging of a column with a feed containing for example an immunoglobulin on a stationary phase containing for example a protein ligand A.
Figure 7:
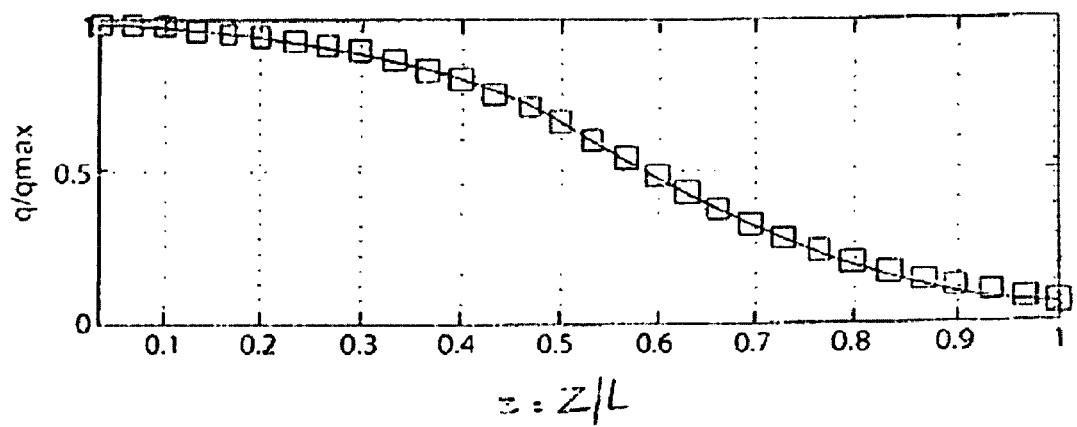
Figure 7:

In FIG. 7, the upper and lower graphs show the concentration of the molecule of interest in the liquid phase and in the solid phase, respectively. The feed fluid is injected on the left of the column and it appears that the fluid leaving the column contains a non-zero concentration of target molecule. To continue the feeding in this way would cause a loss of the target product, which is economically unacceptable. Therefore feed in fact stops whereas the product has left the column before complete adsorption has been carried out. The stages of rinsing, elution, regeneration and equilibration then begin for desorption of a target molecule adsorbed on all or part of the chromatographic resin or support. It should be noted that these stages consume an amount of fluids that depends mainly on the volume of the column and not on the quantity of target product to be desorbed; it is therefore beneficial to have a column that is charged as much as possible, from the standpoint of consumption of the different fluids.

Figure 8:
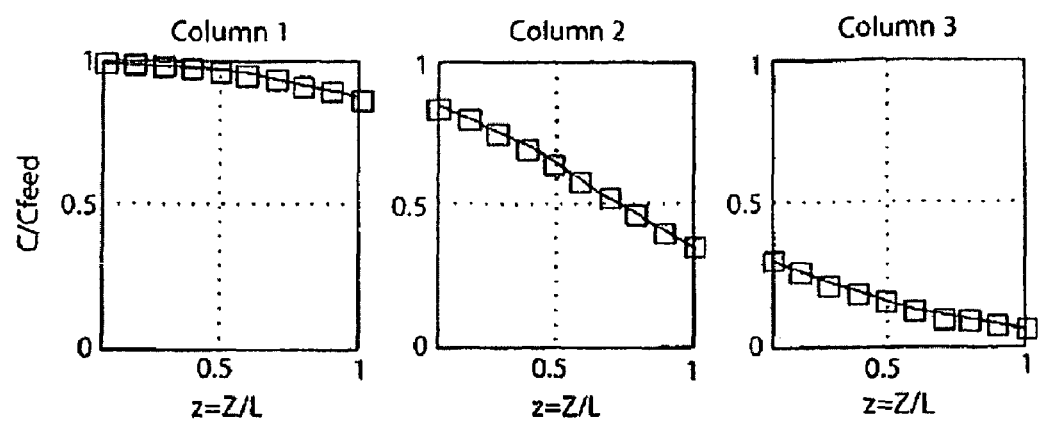
FIG. 8 illustrates the charging of three columns with a third of the volume of the column in FIG. 7.
Figure 8:
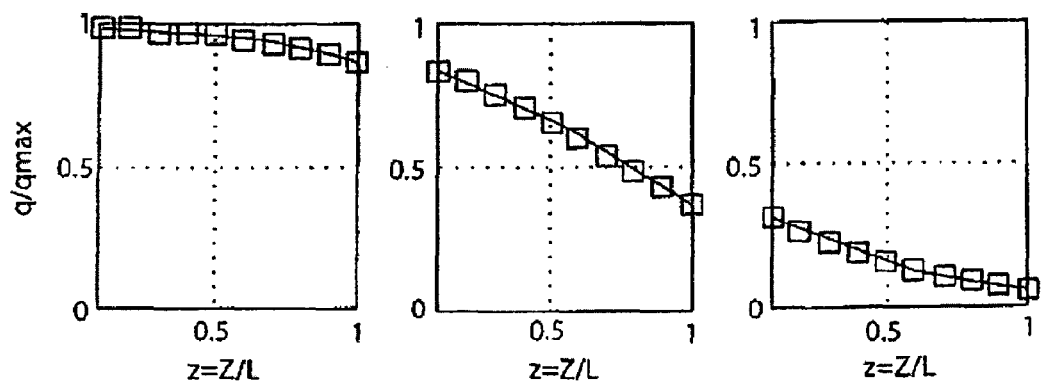
Figure 8:
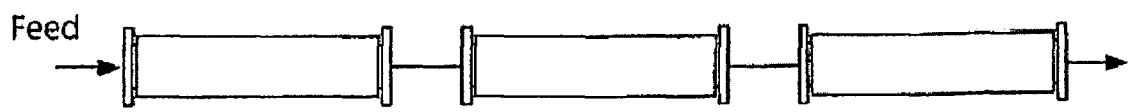

If the case in FIG. 7 is now considered, but assuming that injection has been carried out on three columns of volumes V/3, FIG. 8 is then obtained.

FIG. 8 shows that under partial adsorption conditions identical to FIG. 7, for the left-most column the stationary phase is completely saturated. In the invention, the feed is no longer applied on the first column, but only on the partially saturated column 2. The subsequent stages of rinsing, elution, regeneration and equilibration are then applied to column 1, which is the outlet of the feed zone. In contrast to the case presented in FIG. 7, in which either the column rinsed, eluted etc., is partially charged with target molecule, the case presented in FIG. 8 shows that column 1 is almost completely charged. The different solvents for rinsing, elution, regeneration and equilibration therefore allow more product to be desorbed in the case in FIG. 8 than in the case in FIG. 7. The consumption of eluent relative to the amount of target molecule produced is thus reduced significantly.

Figure 9:
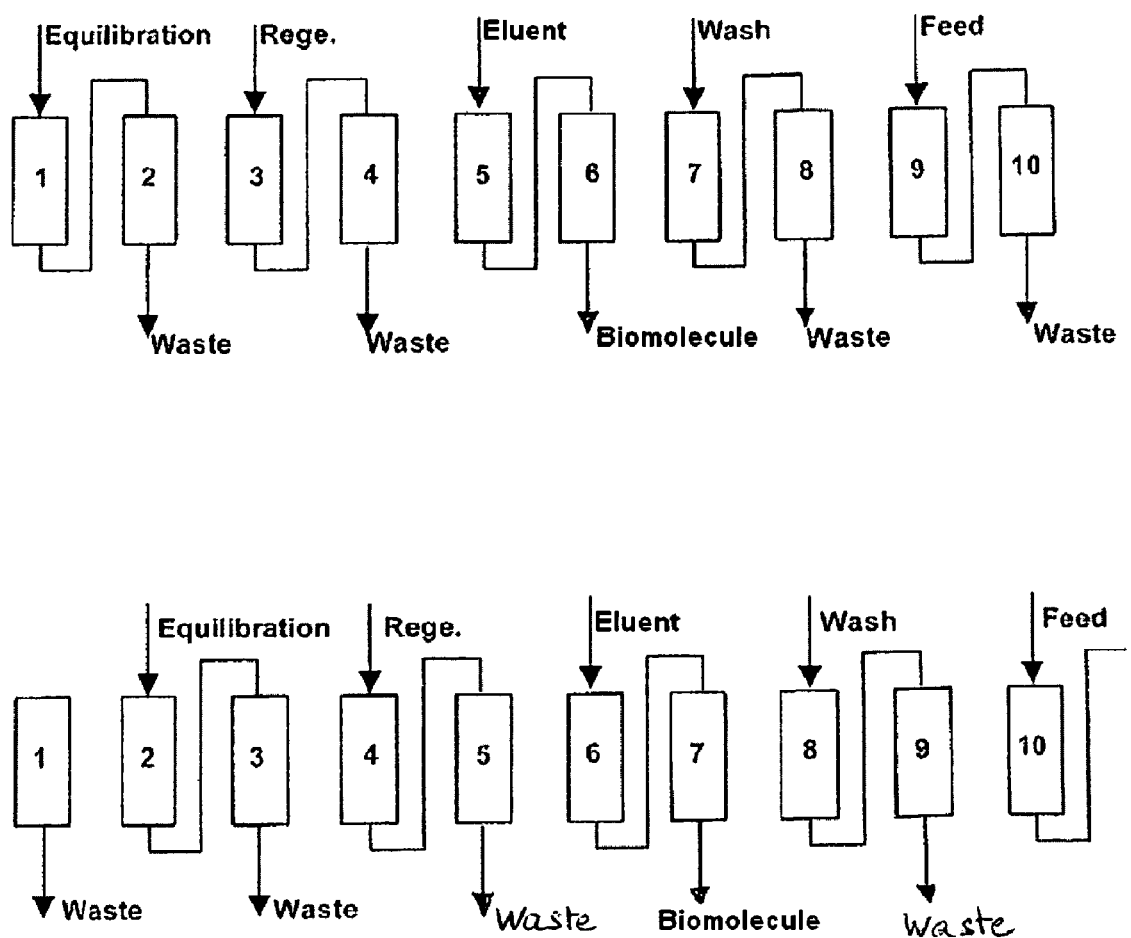
FIG. 9 is a diagrammatic representation of an SMB embodiment according to the prior art.

Applying this principle, a synchronous, periodical and non-sequenced multicolumn system of the AST type can be used as shown in FIG. 9. FIG. 9 shows that the process involves different fluid inlets. Between each of these inlets, it is possible to define a zone: for example between the feed inlet (Feed) and the inlet of the equilibration fluid, the feed zone is defined. Between the rinsing solution (Wash) and the feed (Feed), the rinsing zone is defined, etc. These zones correspond to the first, second, third, fourth and fifth zones of the process according to the invention (in the case of amino acid and ion exchange resin, the fourth and fifth zones are merged and the eluent and the regenerating agent are the same fluid). The periodical displacement is also shown in FIG. 9. This reiterates the principle shown in FIG. 1 (which corresponded to the case with four fluids).

If column No. 9, at the end of the cycle is considered, it is in the feed configuration. After switching, it is located just before the outlet of the washing stage. Consequently, what leaves this column just after the switching of the lines still contains the feed, therefore containing the molecule of interest, unpurified, which in fact becomes diluted and is lost.

According to the invention, to avoid losing this portion of the feed and diluting it, a displacement of the fronts is applied, as was done for the case of the amino acid described above. The sequence is then as described in FIG. 10, starting from the position in (1). Instead of directly switching the feed line (Feed) and the effluent line (Waste) that precedes it, a transition stage for column No. 9 is left. In this example the other lines are fixed. Passing on to position (2), which comprises the fluid connection of the two zones, columns 8 and 9 being in fluid connection, the other columns remaining unchanged. The rinsing solution (identified as Wash) in white propels the feed (and therefore the product of interest) towards column 10, which is identified by position (3). Column 9 can then be described as "in zone transition". By way of transition or at the end of displacement of the fronts, position (4) is reached. The liquid contained in column 9 now contains hardly any product of interest, and the feed line (Feed) and the effluent line (Waste) which precedes it can therefore reappear; this is identified at position (5). It is then possible to proceed to the switching of the other lines.

In this case, this stage, or sub-sequence of displacement of the fronts, makes it possible to avoid losing the liquid contents of column 9, which in this case contain the product of interest. With an affinity process, it is conventional to consider that 5 to 20 volumes of column are generally necessary for saturating a column. As the porosity of the chromatographic bed is approximately equal to 0.8, the amount of liquid contained in a column is therefore 80% of the volume of the column. Avoiding the loss of an amount of feed corresponding to 0.8 column volume out of 5 to 20 volumes introduced will therefore make it possible to improve the yield significantly.

This transition stage applied this time to the displacement of the line of regenerating solvent makes it possible to economize 0.8 column volume out of 3 to 5 column volumes injected in most cases. It can therefore also reduce the consumption of certain regeneration solvents.

In the present invention, the feed line as well as each fluid inlet line can in fact move freely relative to the others with the possibility of having a sub-sequence of displacement of the fronts. In fact, each displacement of the fronts can be carried out line by line, synchronously or asynchronously, and also line by line. All combinations can be envisaged, it being understood that the displacement of the fronts comprises at least the displacement of the feed front, preferably also the displacement of the regenerating agent front. This displacement of the fronts, at least for a column that is in the feed phase, is impossible with the systems according to the prior art.

It is also possible to carry out a displacement of the fronts by an increment of one column, as well as by an increment less than or greater than one column.

Figure 10:
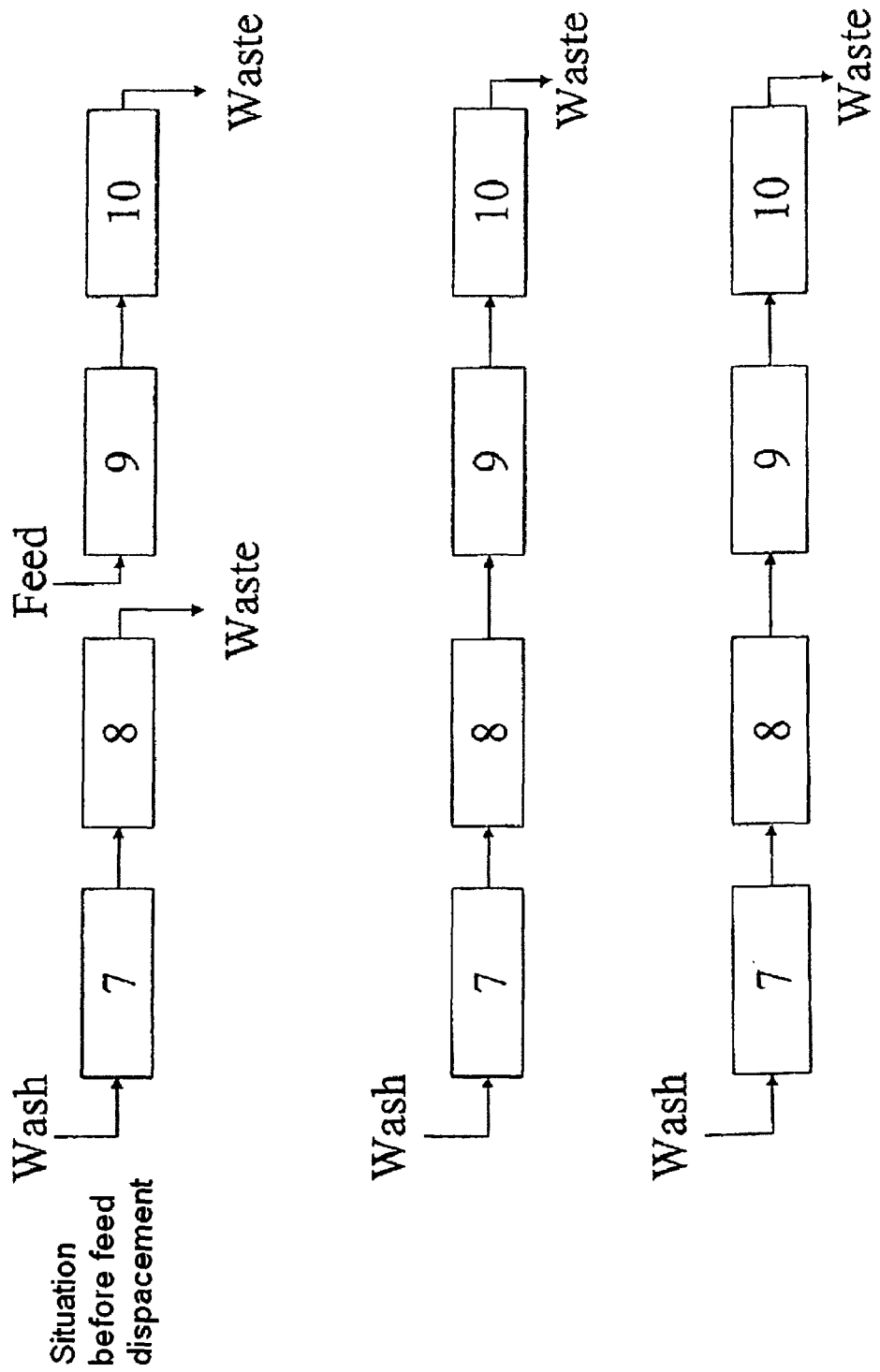
FIGS. 10A and 10B are diagrammatic representations of a displacement of the fronts corresponding to a transition sequence according to the invention according to one embodiment.
Figure 10B:
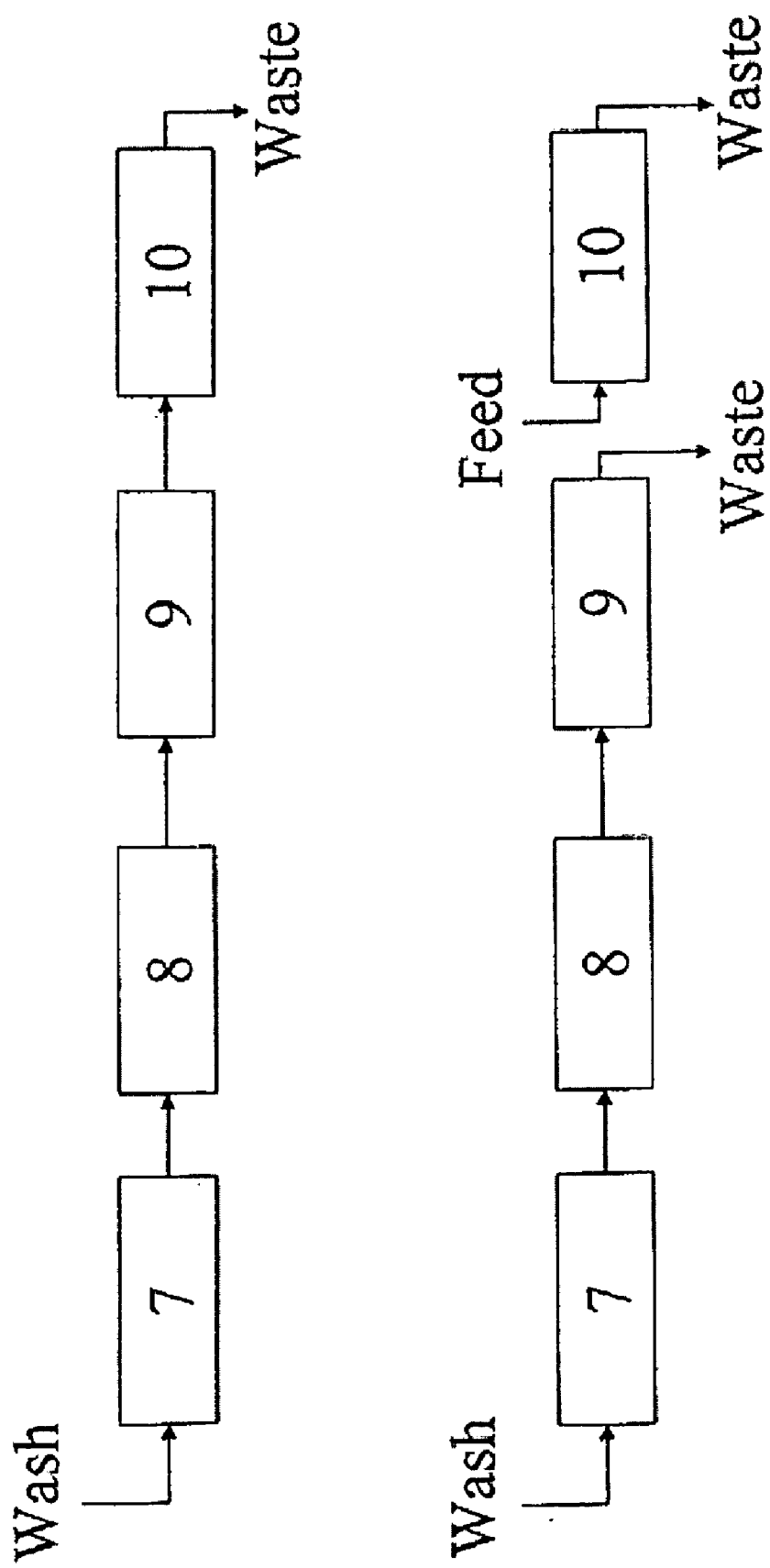
Figure 11:
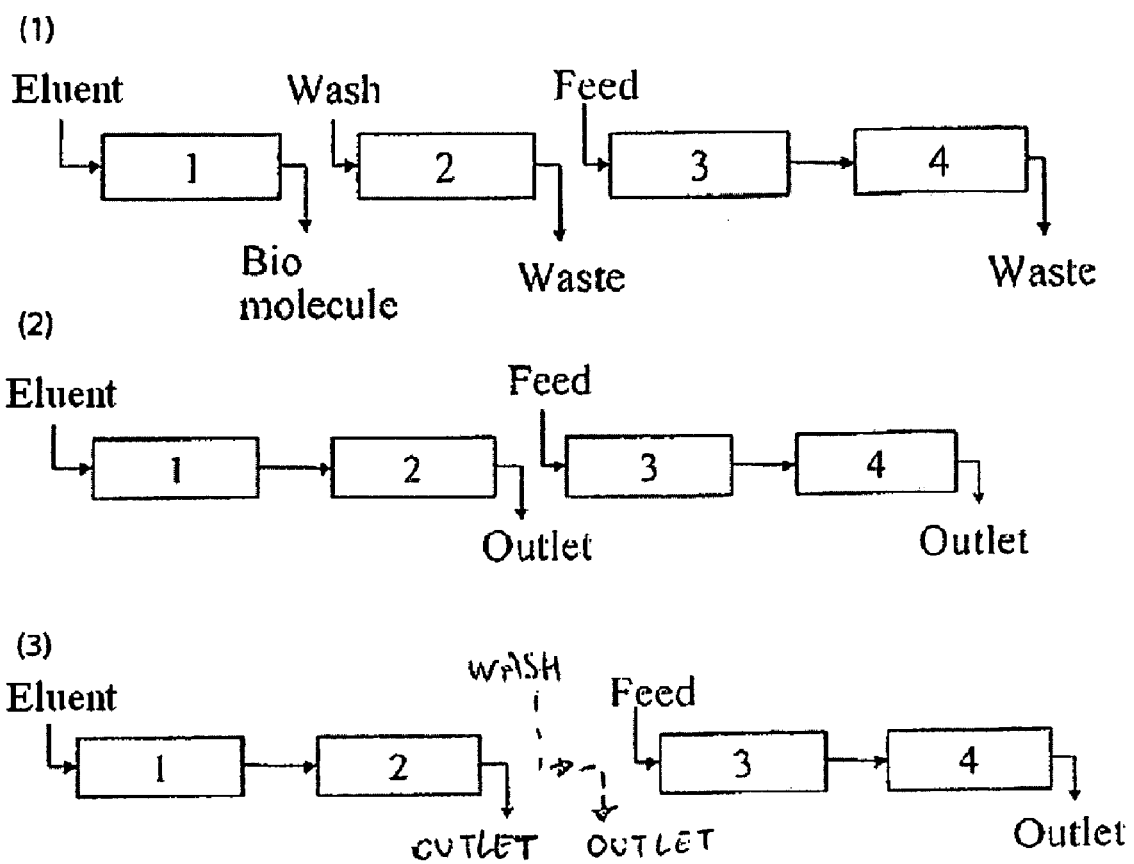
FIG. 11 is a diagrammatic representation of an asynchronous displacement of a rinsing injection line according to the invention according to another embodiment.

A particular embodiment involves the omission of one inlet line and of one effluent line. This case is shown in FIG. 11. In this figure, the starting point is considered to be position (1), with lines of eluent, rinsing (Wash) and feed (Feed), the extract and effluent lines being marked "biomolecule" and "Waste", without being limited to the production of a biomolecule as the process is applicable to any type of product. In the case of FIG. 10, the periodical displacement is asynchronous. Let us consider the case where the line for feed of rinsing solution (Wash) is displaced to 30% of the cycle time; in this case the column in transition during the rinsing is defined as non-existent. Feed and Eluent are displaced to the cycle end. At 30% of the cycle, a displacement command is given to the line of rinsing solution. The rinsing line therefore passes from the inlet of column 2 to the inlet of column 3, being superposed on the feed line. In the specific case under consideration, a superposition of inlet lines is undesirable, and it is defined that in such a case it is the line downstream that takes precedence. Position (2) is reached. Symbolically, it is possible to consider a situation shown diagrammatically at position (3).

Similarly, if three lines are superposed, it is the line downstream that takes precedence.

Figure 12:
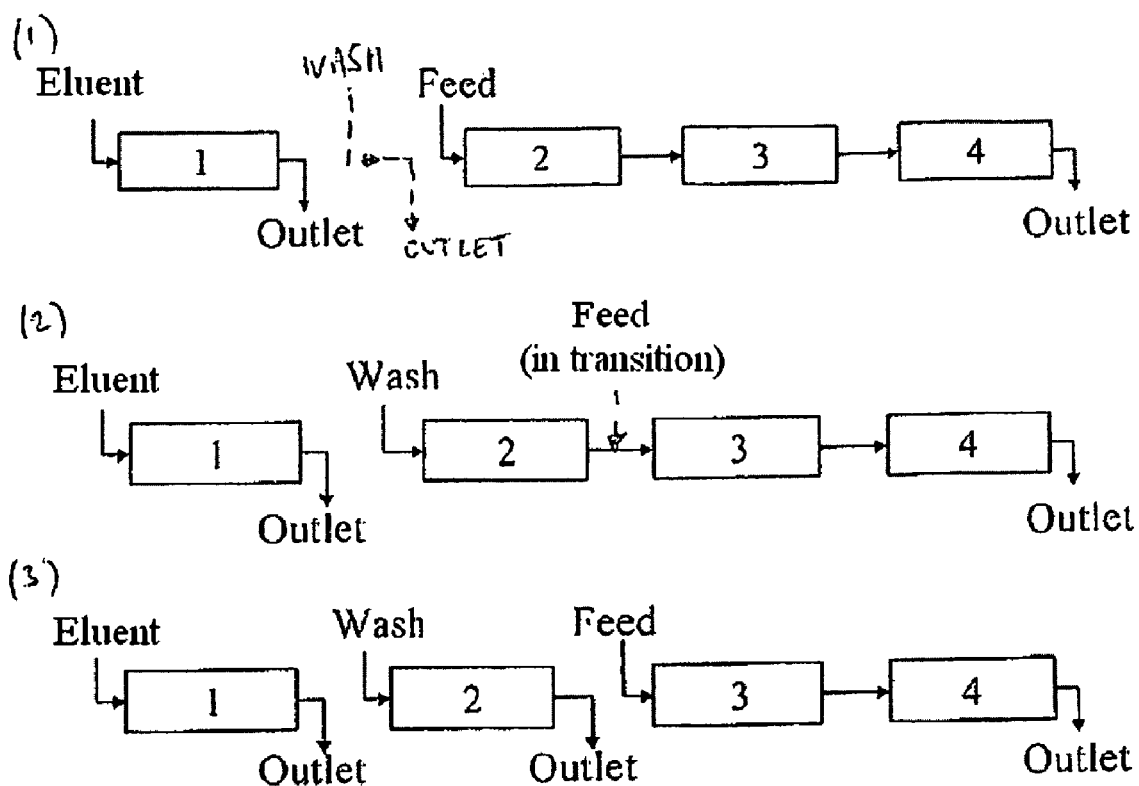
FIG. 12 is a diagrammatic representation of an asynchronous displacement of the feed line with a transition sequence according to the invention according to another embodiment.

The case in FIG. 12 is another particular case of periodical asynchronous displacement. In position (1), it is assumed that at the start of the cycle, the line of rinsing solution is superposed on the feed line. Applying the principle of the superposition of lines, it is the feed line that takes precedence. If the feed line is displaced asynchronously, before the line for rinsing solution, with a transition time (for the displacement of the fronts), position (2) is then reached. Once the transition or displacement of the fronts is carried out, in position (3) is again reached and the displacement of the feed line is effective.

The use of an asynchronous mode makes it possible to reduce the total number of columns by causing several zones to coexist in the same column during a given cycle.

Figure 13:
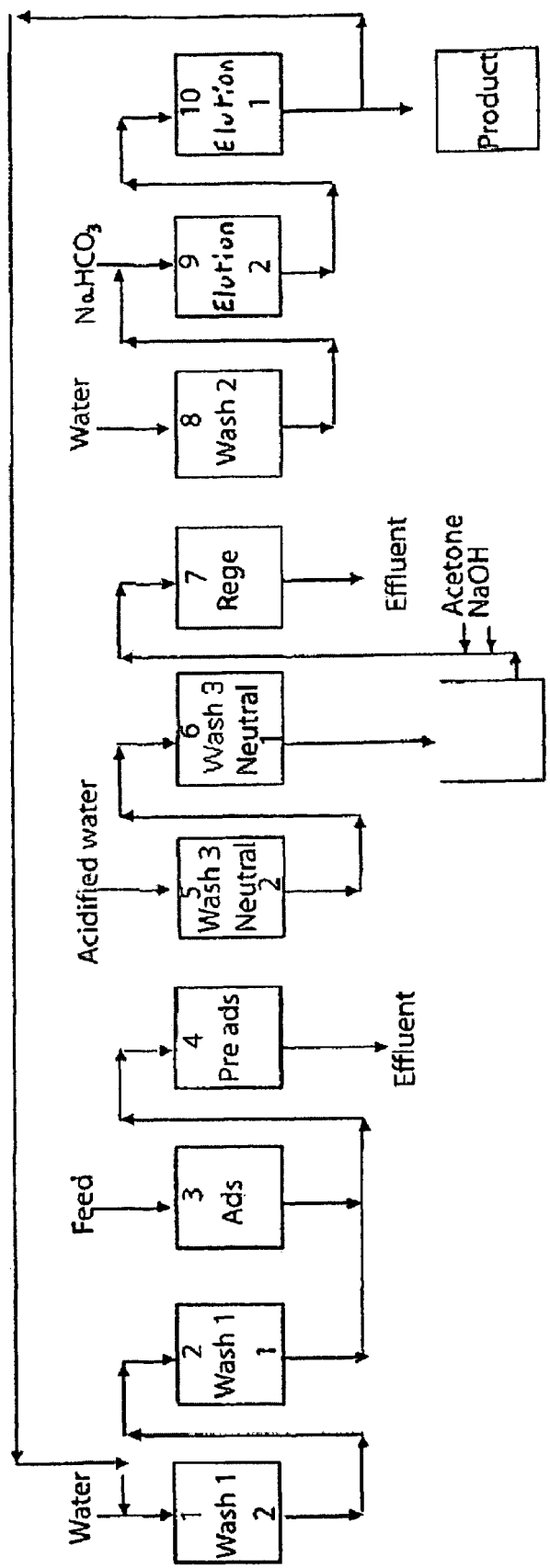
FIG. 13 represents a process according to the invention with 6 lines of fluids.

FIG. 13 is an example of a process according to the invention with several lines of fluids, numbering 6 here. The case shown in FIG. 13 represents the separation of an antibiotic. In this embodiment, columns 1 and 2 are supplied with water as rinsing solution, and a dilute solution of the product of interest is obtained at the outlet. The feed is supplied to adsorption column 3 whereas the preadsorption column downstream is supplied by the outlet of column 3 (which can be combined with the outlet of the washing columns 1, dilute feed solution) and an effluent is obtained at the outlet from the preadsorption column (raffinate). Acidified water is used as equilibration solution in columns 5 and 6, for carrying out a neutral rinsing (the columns originating from a basic regeneration). The effluent leaving the rinsed columns 5 and 6 is combined with regeneration components, such as acetone and soda. Column 7 is then regenerated, and an effluent is obtained at the column outlet. Column 8 is submitted to washing with water (this stage can be omitted), and sodium carbonate is added to the effluent. This solution is an eluting solution, which is sent to columns 9 and 10, the effluent from which is the extract. This extract supplies the product of interest and the water that is separated can be recycled to the process (shown here returned for the washing of columns 1 and 2).

Figure 14:
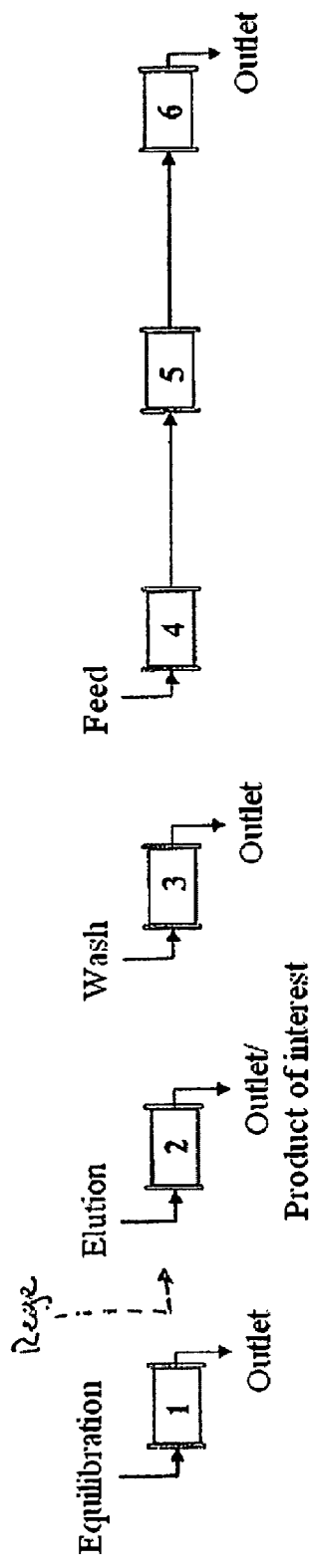
FIGS. 14A, 14B, and 14C represent the different sequences of a process according to the invention implemented with 5 fluids.
Figure 14:
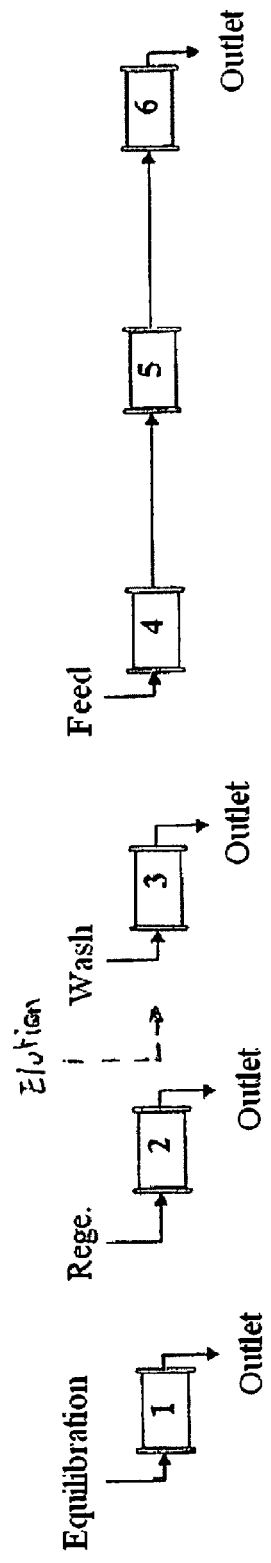
Figure 14B:
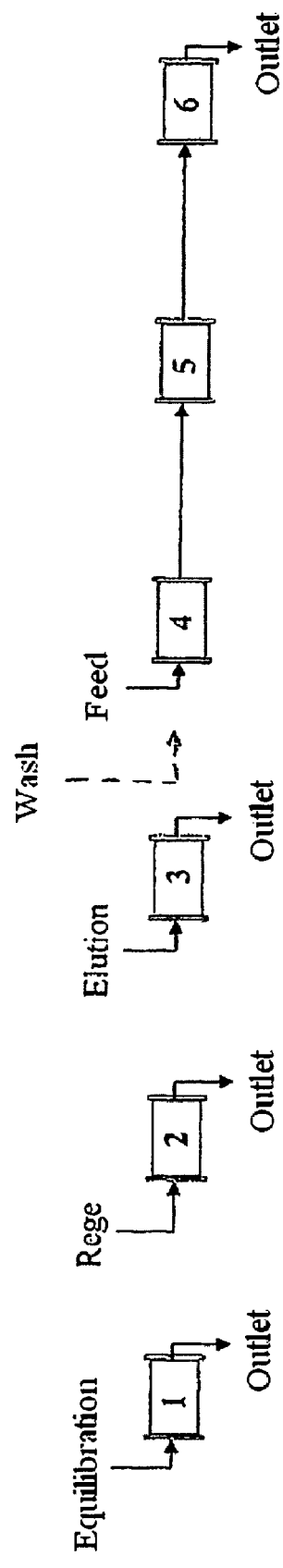
Figure 14B:
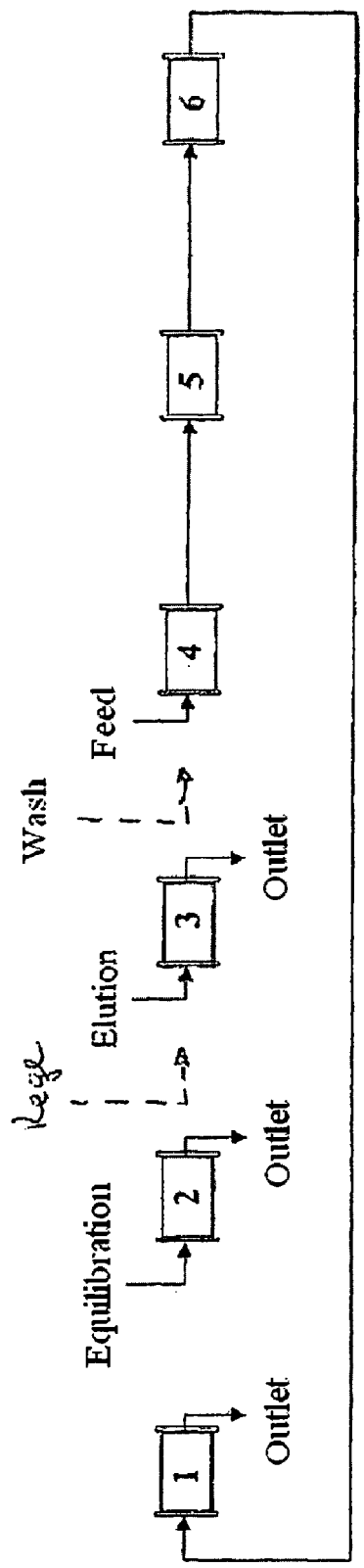
Figure 14:
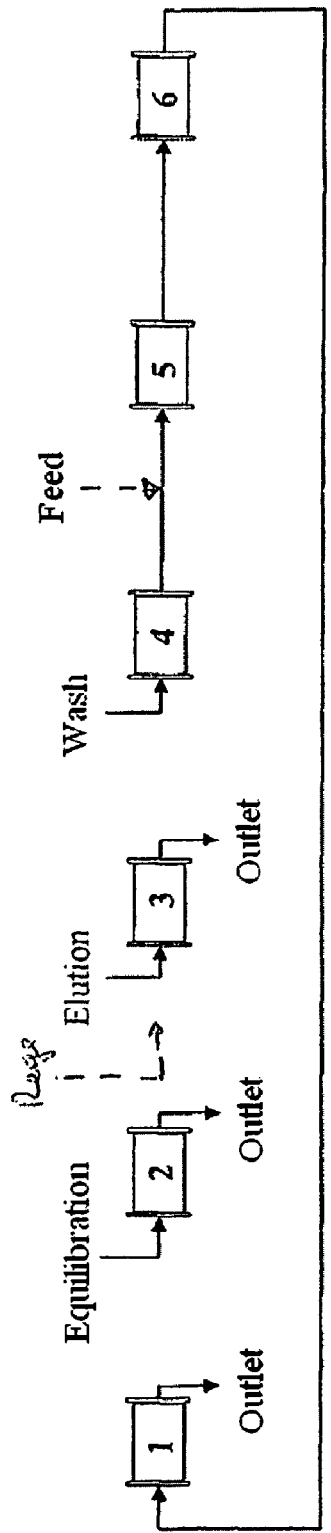
Figure 14:
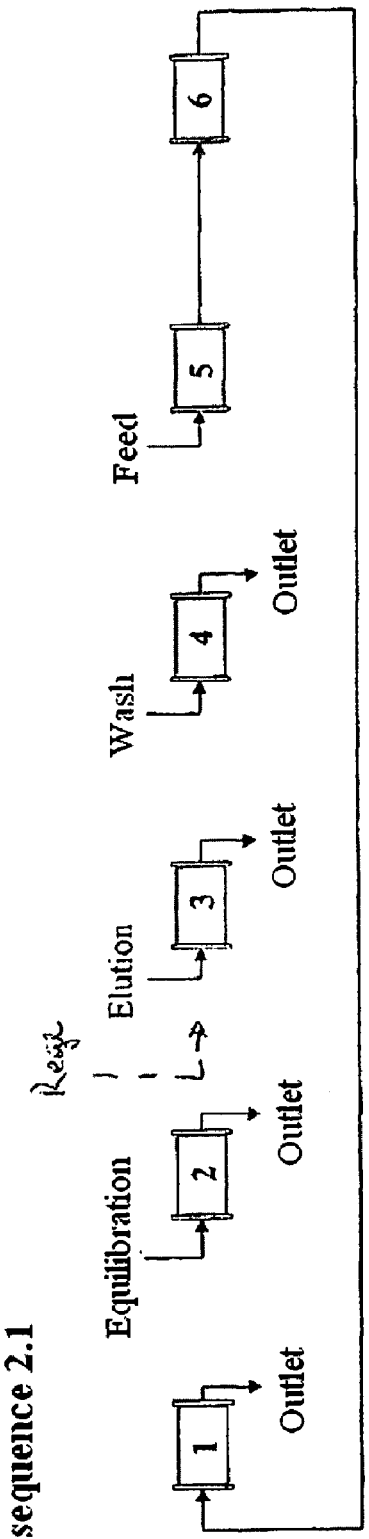

Whereas the process described in FIG. 9 shows the implementation of these stages according to a periodical, non-sequential process in which a displacement of the lines for injection of the different solutions is carried out synchronously and non-sequentially, FIG. 14 shows a process in which the displacements are asynchronous and sequential. FIG. 14 therefore shows an example of implementation of stages (a) to (e) according to the invention on a system with 6 columns where the cycle is broken down into 5 sub-sequences corresponding to the displacements of certain lines for injection at different moments of the sequence.

At the start of the first sequence the situation is as follows:
- the line for injection of the equilibration solution is at column 1
- the lines for injection of the regenerating solution and eluting solution are at column 2. As explained previously, in the case of a superposition of lines, it is the line downstream that prevails, in this case the line for injection of eluting solution.
- the line for injection of the washing solution is at column 3
- the line for injection of the solution of feed to be treated is at column 4.

This configuration corresponds to sub-sequence 1.1 which lasts from t=0 to for example t=0.24*Δt.

At the end of sub-sequence 1.1, the elution line for example is displaced by one column. Sub-sequence 1.2 begins, the configuration is as follows:
- the line for injection of the equilibration solution is at column 1.
- the line for injection of the regenerating solution is at column 2.
- the line for injection of the eluting solution is superposed on the injection of washing solution at column 3. As the line downstream takes precedence, it is the washing solution that is injected at column 3.
- the line for injection of the solution of feed to be treated is at column 4.

Sub-sequence 1.2 lasts for example from $t=0.24*\Delta t$ to $t=0.36*\Delta t$.

At the end of sub-sequence 1.2, the washing line for example is displaced. Sub-sequence 3 begins, the configuration is as follows.

- the line for injection of the equilibration solution is at column 1.
- the line for injection of the regenerating solution is at column 2.
- the line for injection of the eluting solution is at column 3.
- the line for injection of the washing solution is superposed on the line for injection of the solution of feed to be treated at column 4. As the feed is downstream of the washing, it is the injection of feed that prevails. It is therefore the solution of feed to be treated that is injected at column 4.

Sub-sequence 1.3 lasts for example from $t=0.36*\Delta t$ to $t=0.60*\Delta t$.

At the end of sub-sequence 1.3, the lines of equilibration and of regeneration are displaced simultaneously. Sub-sequence 1.4 begins, the configuration is as follows.

- the line for injection of the equilibration solution is at column 2
- the line for injection of the regenerating solution is superposed on the line for injection of the eluting solution at column 3. The line downstream that prevails in this case is the injection of the eluting solution.
- the line for injection of the washing solution is superposed on the line for injection of the solution of feed to be treated at column 4. As the feed is downstream of the washing, it is the injection of feed that prevails. It is therefore the solution of feed to be treated that is injected at column 4.

Sub-sequence 1.4 lasts for example from $t=0.60*\Delta t$ to $t=0.76*\Delta t$.

At the end of sub-sequence 1.4, a transition is carried out corresponding to the displacement of the product of interest contained in the liquid phase of column 4 to column 5. To do this, injection of the solution of feed to be treated is stopped, there is therefore a transition from feeding stage (b) corresponding to the displacement of the fronts of concentrations of the liquid phase of the unretained impurities and of the product of interest by stage (c). The transition is therefore a stoppage of injection of the feed to be treated corresponding to the displacement of the fronts induced by stage (c).

Sub-sequence 1.5 begins, the configuration is as follows.

- the line for injection of the equilibration solution is at column 2
- the line for injection of the regenerating solution is superposed on the line for injection of the eluting solution at column 3. The line downstream that prevails in this case is the injection of the eluting solution.
- the line for injection of the washing solution is at column 4.

Sub-sequence 1.5 lasts for example from $t=0.76*\Delta t$ to $t=\Delta t$.

At the end of sub-sequence 1.5 the first cycle is completed, the solution of feed to be treated is injected at column 1.5.

Sub-sequence 2.1 of sequence 2 can therefore begin; note that sub-sequence 2.1 of sequence 2 is similar to sub-sequence 1.1 of sequence 1 except that the lines are shifted by one column.

It therefore appears that the asynchronous displacement of the lines makes it possible to carry out, in sequence 1 on column 2, the stages of elution, regeneration and equilibration, in fact this makes it possible to reduce the number of columns relative to a process using a displacement of synchronous type.

It also appears that, owing to the invention, the transition sequence corresponding to stoppage of injection of the solution of the feed to be treated (stage (b)) makes it possible to avoid losing the product of interest still contained in column 4 at the end of sequence 1.4.

It is also possible to use several lines of eluents, for example for treating solutions containing several products of interest, which are desorbed or exchanged under different conditions. A first eluent will provide selective recovery of the first product of interest while a second eluent allows selective recovery of the second product of interest. An example of application is the recovery of milk proteins.

In the description of the present invention, the term "column" must be understood as meaning a physical column or any other part of a column identifiable as a cell, when the physical column has injection and withdrawal points at several levels. A single physical column can thus be divided into several sections or cells, and the invention will be applicable to this configuration.

The invention therefore applies to all products of interest that can be separated by chromatography. For example, the invention permits the separation of an amino acid such as lysine, the stationary phase being an ion exchange resin and the rinsing solutions being water. In the case of biomolecules, for the separation of immunoglobulin (e.g. bovine, rabbit or human IG) from serum (bovine, rabbit, or human) it is possible to use stationary phases based on the principle of affinity, for example a Protein A grafted Sepharose gel, and eluents selected from PBS solution (phosphate-buffered saline), glycine-HCl solution, HCl solution, etc.

EXAMPLES

The following examples illustrate the invention without limiting it.

Example 1

Amino Acid/Lysine

The process according to the invention applies in particular to an amino acid, such as lysine; the invention therefore provides a process for separating an amino acid from an aqueous solution containing such an amino acid and impurities, by passing this solution over a fixed bed of ion exchange resin, comprising at least four zones in series, means for flow of liquid being arranged between adjacent zones and between the last and the first zones, said amino acid being selectively exchanged by contact with said ion exchange resin and at least one of the impurities being exchanged relatively less on this ion exchange resin than the amino acid, the exchange capacity of said ion exchange resin being regenerated by the action of a regenerating agent, characterized in that it comprises several sequences, each sequence comprising the following stages:

(a) introduction of a certain volume of water at the inlet of the first zone and approximately simultaneous withdrawal of the same volume of a liquid diluted with said amino acid, at a point situated downstream of this zone;

(b) introduction of a certain volume of said aqueous solution at the inlet of the second zone and approximately simultaneous withdrawal of the same volume of a liquid rich in the impurity or impurities exchanged relatively less, at a point situated downstream of this zone;

(c) introduction of a certain volume of water at the inlet of the third zone and approximately simultaneous withdrawal of the same volume of a liquid diluted with regenerating agent, at a point situated downstream of this zone;

(d) introduction of a certain volume of regenerating agent at the inlet of the fourth zone and approximately simultaneous withdrawal of the same volume of a liquid rich in the amino acid, at a point situated downstream of this zone;

it being possible for stages (a), (b), (c) and (d) to be implemented simultaneously or not;

each subsequent sequence being carried out by the periodical downstream displacement, by approximately the same volume increment, of the introduction and withdrawal points, and comprising moreover a stage (e) displacement of the fronts in the zones before the periodical displacement.

In the case of lysine, the fluids are culture broths, acid solutions and as regenerating agent a solution of ammonia. If the process according to the invention is compared with a continuous process of the prior art, for example the AST process, for a given production of lysine, the process offers significant gains. For an identical production the consumables are reduced by 10%, the consumption of water is slightly lower, the amount of effluent produced is approximately identical, and the number of columns is divided by three.

Example 2

Biomolecule/IgG

For the implementation of the separation of a biomolecule, the process is implemented for example according to the procedure in FIG. 14. IgG may be mentioned as the biomolecule. In such a case, the compositions of the solutions used are as follows:

| | |
|---|---|
| Equilibration | PBS (Phosphate-Buffered Saline) pH: 7.4 |
| Renegeration | HCl pH: 2 |
| Eluent | Glycine HCl pH: 3 |
| Wash | PBS (Phosphate-Buffered Saline) pH: 7.4 |
| Feed | Aqueous solution of immunoglobulin G IgG |

The adsorption of human IgG using a ligand of the protein A type has been described by Jungnauer (Journal of Chromatography B 790 (2003) 35-51). The breakthrough curves of IgG on these types of stationary phases show kinetic limitations similar to what is shown in FIG. 7. In such a case, the results obtained showed that the use of several columns in the adsorption stage allows, according to the process of the invention, better utilization of the stationary phase as shown in FIGS. 7 and 8, thus obtaining a reduction in the consumption of eluent.

The process described applies quite particularly to human immunoglobulins G (h-IgG) or antibodies. The invention therefore provides a process for separating these biomolecules from a solution containing said molecules as well as impurities, by passing this solution over a bed of stationary phase specific to affinity chromatography (protein A grafted on a matrix). The affinity chromatography process developed implements the 5 chromatographic stages defined by the use of a specific fluid at the inlet.

The feed fluid (IgG and impurities in PBS buffer pH 7.4, Phosphate-Buffered Saline) contains the feed to be treated and its composition (buffer pH, salinity) makes it possible, on charging the column with this fluid, for the molecule of interest to bind to the stationary phase, whereas most of the impurities pass through, without being retained. At the end of the feeding stage, the column contains a stationary phase on which the component of interest is adsorbed.

The rinsing fluid (PBS buffer pH 7.4), with salinity and pH identical to the feed fluid, does not contain feed to be treated. This stage renews the liquid phase of the column so that there are no longer impurities that could be eluted at the same time as the IgG. This stage also avoids losing the product of interest contained in the liquid phase of the column.

The eluting fluid of the IgGs (Glycine HCl 0.1 M, pH 2.5): fluid for altering the nature of the interactions between the IgGs and the stationary phase, it permits desorption of the target molecule from the stationary phase, the target molecule is then collected from the outgoing liquid.

The regenerating fluid (Glycine HCl 0.1M, pH 2): after elution, impurities may remain strongly absorbed on the stationary phase, which may have an adverse effect on its stability or hygienic character.

The equilibration fluid (PBS buffer pH 7.4): generally identical to the rinsing fluid used after feeding, this fluid makes it possible to remove the regenerating fluid from the column before carrying out the next feed.

The test presented according to the sequential multicolumn separation process uses 3 columns in this example. The 5 stages to be used in the purification of the IgGs are distributed over the different sequences and sub-sequences according to the diagram shown in FIG. 15.

The system made up of 3 columns implies that one cycle is divided into 3 sequences. Each of the 3 sequences is divided into 4 sub-sequences:

Sequence 1:

Sub-sequence 1.1: The first two columns 1 and 2, in series, define a feed zone. Column 3 is located in the equilibration zone.

Sub-sequence 1.2: Once column 1 is almost fully charged with IgG, it passes to the washing zone. Column 3 then enters the feed zone, the 3 columns are thus put in series during this sub-sequence.

Sub-sequence 1.3: Column 1, once saturated with IgG and washed of its impurities, can enter the elution zone. Feed takes place on columns 2 and 3 in series.

Sub-sequence 1.4: Column 1 is eluted and then regenerated. Feed still takes place on columns 2 and 3 in series.

For this example with 3 columns, 3 sequences are used for carrying out a complete cycle. Sequence 2 is derived from sequence 1 by displacement of one column of the lines of entering and leaving fluids as described in FIG. 15. Similarly, sequence 3 (not shown) is derived in an identical manner from sequence 2. Each of the subsequent cycles starts again from sequence 1 and thus ensures continuity of the process.

Figure 15:
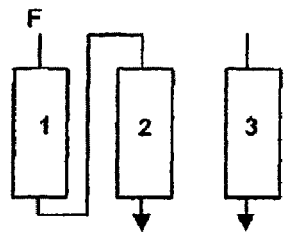
FIG. 15 represents the different sequences for the separation of IgG.
Figure 15:
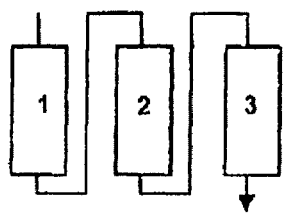
Figure 15:
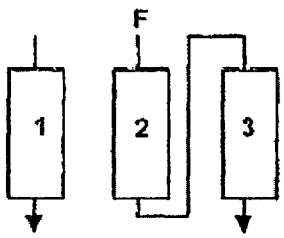
Figure 15:
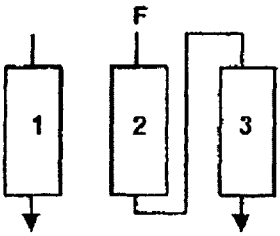
Figure 15:
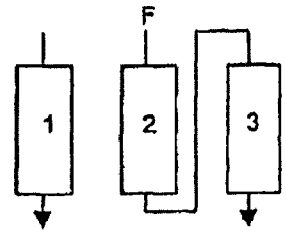
Figure 15:
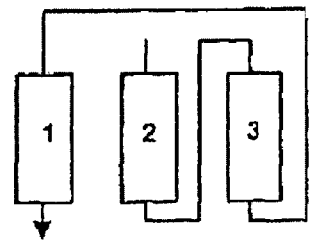
Figure 15:
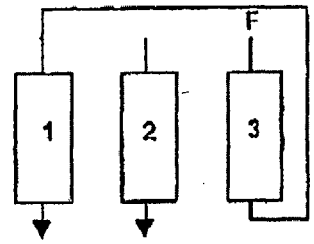
Figure 15:
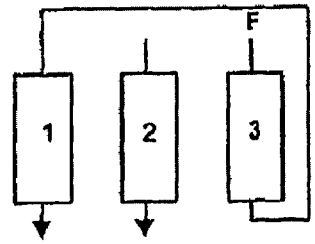

The sequence shown in FIG. 15 comprises 5 zones, each of these zones being defined by the inlets of the different fluids. For example, in sub-sequence 1.1, the feed zone is located between the feed inlet on column 1 and the inlet for the equilibration fluid on column 3.

In sub-sequence 1.2, where the 3 columns are in series, there is interruption of feed and displacement of the feeding front on columns 2 and 3.

In the system described previously, 2 tests were carried out at two different feed rates: 450 cm/h and 620 cm/h. The feed solution contains human polyclonal Immunoglobulins G at 1 g/l as well as impurities characteristic of a feed obtained from a fermentation process. The process parameters used for the purification of these IgGs are listed in Table 1.

TABLE 1 parameters used on 3 columns (1.6 cm ID × 10 cm H) containing
20 ml of MabSelect Protein A phase (GE Healthcare).

| Rate | Sub-sequence 1 | Sub-sequence 2 | Sub-sequence 3 | Sub-sequence 4 | Sequence duration | Cycle duration |
|---|---|---|---|---|---|---|
| 450 cm/h | 45 min | 5 min | 6 min | 5 min | 61 min | 183 min |
| 620 cm/h | 28 min | 5 min | 7 min | 5 min | 45 min | 135 min |

The results are compared with the performances obtained on a batch column (Table 2) containing the same quantity of stationary phase, namely 3×20 ml=60 ml (2.8 cm ID×10 cm H).

For identical purity and yield in batch mode and according to the process described, the following comparison criteria were established:

Working capacity: Quantity (in grams) of IgG fixed per litre of stationary phase.

Productivity: Quantity (in grams) of IgG purified per day and per litre of stationary phase.

Consumption: Total quantity of fluids used (for rinsing, elution, regeneration, equilibration) in ml per gram of IgGs purified.

TABLE 2 comparative results of the performances obtained in batch mode and according to the process described.

| | | Batch Mode 1 column | Invention 3 columns |
|---|---|---|---|
| Rate 450 cm/h | Working capacity: | 20 g/l | 40 g/l |
| | Productivity: | 220 g/day · litre | 310 g/day · litre |
| | consumption: | 1500 ml/g | 830 ml/g |
| Rate 600 cm/h | Working capacity: | 15 g/l | 40 g/l |
| | Productivity: | 240 g/day · litre | 445 g/day · litre |
| | consumption: | 2000 ml/g | 685 ml/g |

In the chromatographic processes for adsorption of antibodies carried out in batch mode, the feed rate is relatively low in order to obtain a higher working capacity, with the phase under consideration. Conversely, if a higher feed rate is chosen, this leads to a significant drop in capacity.

The results obtained with the process described showed that the use of several columns in series in the adsorption stage provides, according to the process described, better utilization of the stationary phase. Thus, even for high feed rates, by putting the columns in series it is possible to operate at a capacity close to the maximum capacity of the phase.

In contrast to the batch process, this process has the advantage that it is not limited by the rate or by the working capacity. This advantage translates into significantly higher productivity of the process relative to the batch process. In our example at 600 cm/h the productivity almost doubled on passing from the batch process to the process described. Moreover, better utilization of the stationary phase in the process described leads to a large reduction in the consumption of the different fluids. In our example at 600 cm/h the consumption fell almost by a factor of 3 on passing from the batch process to the process described.

Example 3

Peptide/Insulin

The process described applies quite particularly to polypeptides such as human insulin. The invention therefore provides a process for separating this polypeptide of 5.8 kDa from a solution containing said molecule as well as impurities, by passing this solution over a bed of stationary phase specific to ion exchange chromatography. The process of ion exchange chromatography developed on a cationic resin implements 3 chromatographic stages defined by the use of a specific fluid at the inlet:

The feed fluid (Recombinant human insulin and impurities in phosphate buffer 40 mM at pH 2.5) contains the feed to be treated. The composition of this fluid makes it possible for the molecule of interest to bind to the stationary phase whereas most of the impurities pass through, as they are poorly retained. At the end of the feeding stage, the column contains a stationary phase on which the component of interest is fixed by ionic force.

The rinsing fluid (phosphate buffer 40 mM pH 2.5) makes it possible to replace the liquid phase of the column containing the feed with buffer. The rinsing stage thus renews the liquid phase of the column so that the impurities contained in the liquid phase are not eluted at the same time as the insulin during the elution stage.

The insulin eluting fluid (NaCl 1M, pH 6): This fluid will permit desorption of the insulin from the stationary phase owing to the increase in ionic strength and pH. The target molecule is then collected from the outgoing liquid.

The test presented according to the multicolumn sequential separation process uses 4 columns in this example. The 3 stages (feed, rinsing, elution) to be used for the purification of insulin are distributed over the different sequences and sub-sequences according to the diagram shown in FIG. 16.

The system made up of 4 columns means that a cycle is divided into 4 sequences. Each of the 4 sequences is divided into 3 sub-sequences:

Sequence 1:

Sub-sequence 1.1: The first 3 columns, in series, define a feed zone. Column 4 is located in the elution zone.

Sub-sequence 1.2: In this sub-sequence, as column 1 is almost fully charged with insulin, it passes to the rinsing zone. Column 4, eluted, no longer contains insulin, so it enters the feed zone, the 4 columns are thus put in series initially. At that moment there is interruption of feed.

Sub-sequence 1.3: The rinsing stage is carried out solely on column 1, which no longer contains insulin in the liquid phase, making it possible to remove the poorly retained impurities. Feed is then resumed on columns 2, 3 and 4 that are still in series.

For this example with 4 columns, 4 sequences are to be used for carrying out a complete cycle. Sequence 2 is derived from sequence 1 by a displacement of one column of the lines of entering and leaving fluids as described in FIG. 16.

Thus, sequence 2 begins because column 1, saturated with insulin and rinsed of its impurities, can enter the elution zone. Feed still takes place on columns 2, 3 and 4 in series.

Similarly, sequence 3 (not shown) is derived in an identical manner from sequence 2. Sequence 4 (not shown) is also derived from sequence 3.

Each of the subsequent cycles starts again from sequence 1 and thus ensures continuity of the process.

Figure 16:
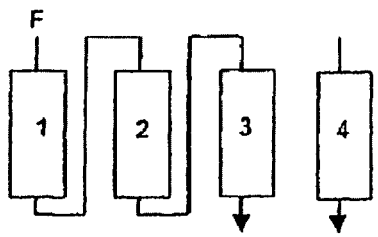
FIG. 16 represents the different sequences for the separation of insulin.
Figure 16:
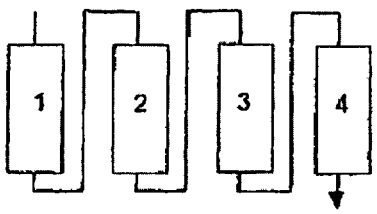
Figure 16:
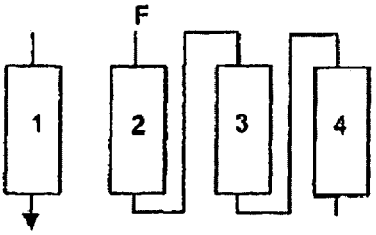
Figure 16:
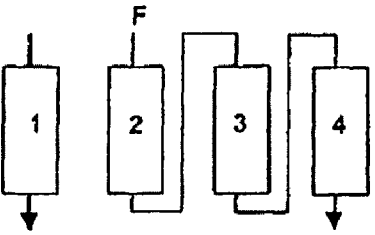
Figure 16:
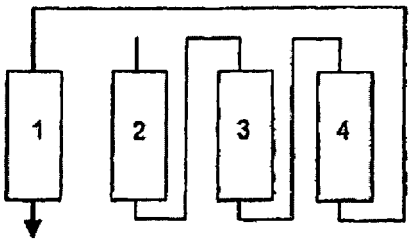
Figure 16:
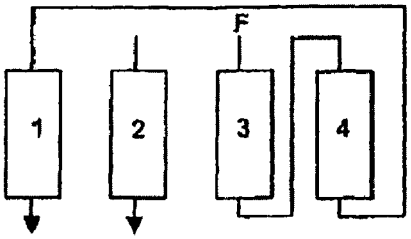

The sequence, shown in FIG. 16, comprises 3 zones (feed, rinsing, elution), each of these zones being defined by the inlets of the different fluids. For example, in sub-sequence 1.1, the feed zone is located between the feed inlet on column 1 and the inlet of the eluting fluid on column 4.

In sub-sequence 1.2, where the 4 columns are in series, there is interruption of feed and displacement of the feeding front on columns 2, 3 and 4.

For the system described previously, a test was simulated on the basis of experimental data at the feed rate of 600 cm/h. The feed solution contains human insulin at 2 g/l as well as impurities characteristic of a feed obtained from a fermentation process. The process parameters used for the purification of this insulin solution are listed in Table 1.

TABLE 1

Parameters used on 4 columns (ID: 0.5 cm × H: 10 cm) each containing 2 ml of cationic resin Toyopearl SP 550 C (Tosoh)

| Linear flow rate | Duration of Sub-sequence 1 | Duration of Sub-sequence 2 | Duration of Sub-sequence 3 | Sequence duration | Cycle duration |
|---|---|---|---|---|---|
| 600 cm/h | 45 min | 5 min | 10 min | 60 min | 240 min |

The results are compared with the performances that would be obtained on a batch column (Table 2) containing the same amount of stationary phase, namely 4×2 ml=8 ml (1 cm ID×10 cm H).

For identical purity and yield in batch mode and according to the process described, the following comparison criteria were established:

Working capacity: Quantity (in grams) of insulin fixed per litre of stationary phase.

Productivity: Quantity (in grams) of Insulin purified per day and per litre of stationary phase.

Consumption: Total quantity of fluids used (rinsing, elution) in ml per gram of insulin purified.

TABLE 2

Comparative results of the performances obtained in batch mode and according to the process described.

| | | Batch 1 column | Invention 4 columns |
|---|---|---|---|
| Rate 600 cm/h | Working capacity: | 40 g/l | 110 g/l |
| | Productivity: | 640 g/day · litre | 660 g/day · litre |
| | Consumption of buffer: | 1750 ml/g | 500 ml/g |

In the chromatographic ion exchange adsorption processes carried out in batch mode, the feed rate is relatively low in order to obtain, on the phase under consideration, a higher working capacity, which is almost tripled. Conversely, if a higher feed rate is selected, this leads to a significant drop in capacity.

The results obtained according to the process described showed that the use of several columns in series in the adsorption stage provides, according to the process described, better utilization of the stationary phase. Thus, even for high feed rates, it is possible, by connecting the columns in series, to operate at a capacity close to the maximum capacity of the phase.

In contrast to the batch process, this process has the advantage of not being limited by the rate nor by the working capacity. This advantage translates into higher productivity of the process relative to that of the batch process as well as a large reduction in consumption of the different fluids. In our example at 600 cm/h, for equivalent productivity in batch mode and according to the process described, the consumption of the expensive buffers was divided almost by a factor of 3 on changing from the batch process to the process described. Tests at higher rates would show even more clearly the differences in productivity and consumption between the process described and the batch process.

In addition, we compared our process with other processes having continuous injection of feed, such as SMB for example, which does not allow operating with a reduced number of columns with several eluents and without loss of yield. In our example, the presence of sub-sequence 2 without feed injection makes it possible to gain 2 to 10% of yield depending on the parameters of feed composition.

The invention claimed is:

1. Process of separation on a solid support by selective sequential multicolumn retention for separating a product of interest from a solution containing said product of interest, by passing this solution over a fixed bed of chromatographic resin comprising at least three zones, means for flow of liquid being arranged between adjacent zones and between the last and the first zone, said process comprising several sequences, each sequence comprising at least one stage selected from an adsorption stage, a rinsing stage, a desorption stage, implemented simultaneously or not simultaneously, each subsequent sequence being carried out by the downstream displacement of the fronts in the zones by approximately the same increment before the periodical displacement of the introduction and withdrawal points, wherein the process comprises a sub-sequence without feed injection wherein the process comprises several sequences, each sequence comprising at least one of the following stages:

(a) introduction of a certain volume of a rinsing solution at the inlet of the first zone and approximately simultaneous withdrawal of the same volume of a liquid diluted with said product of interest, at a point situated downstream of this zone;

(b) introduction of a certain volume of said feed solution at the inlet of the second zone and approximately simultaneous withdrawal of the same volume of a liquid rich in the impurity or impurities that are retained relatively less, at a point situated downstream of this zone;

(c) introduction of a certain volume of a rinsing solution at the inlet of the third zone and approximately simultaneous withdrawal of the same volume of a liquid diluted with regenerating agent, at a point situated downstream of this zone;

(d) introduction of a certain volume of regenerating agent at the inlet of the fourth zone and approximately simultaneous withdrawal of the same volume of a diluted liquid, at a point situated downstream of this zone;

(e) introduction of a certain volume of an eluent at the inlet of the fifth zone and approximately simultaneous withdrawal of the same volume of a liquid rich in said product of interest, at a point situated downstream of this zone;

it being possible for stages (a), (b), (c), (d) and (e) to be implemented simultaneously or not simultaneously;

each subsequent sequence being carried out by the periodical downstream displacement, by approximately the same volume increment, of the introduction and withdrawal points, and comprising moreover a stage (f) displacement of the fronts in at least zone (b) before the periodical displacement.

2. Process according to claim 1, wherein stages (d), and (e) are implemented with the same fluid, said stages then corresponding to a stage consisting of:

(d) introduction of a certain volume of regenerating agent at the inlet of the fourth zone and approximately simultaneous withdrawal of the same volume of a liquid rich in said product of interest, at a point situated downstream of this zone;

the fourth and fifth zones then being merged in a single fourth zone.

3. Process according to claim 1, wherein stages (a), (b), (c) and (d) are implemented at least partly simultaneously.

4. Process according to claim 1, wherein said displacement of the fronts displaces the fronts synchronously in the different zones.

5. Process according to claim 4, wherein the displacement of the fronts comprises the following stages:

(i) creation of a circulation loop zone between the different zones; and (ii) applying circulation in said loop for displacing the fronts.

6. Process according to claim 4, wherein the displacement of the fronts comprises the following stages:

(i) creation of a first displacement zone by fluid connection from the outlet of the first zone to the inlet of the second zone and by fluid connection from the outlet of the second zone to the inlet of the third zone, and downstream displacement of the inlet of the first zone to provide the inlet of the first displacement zone and upstream displacement of the outlet of the third zone to provide the outlet of the first displacement zone; and creation of a second displacement zone by fluid connection from the outlet of the third zone to the inlet of the fourth zone and by fluid connection from the outlet of the fourth zone to the inlet of the fifth zone and fluid connection from the outlet of the fifth zone to the inlet of the first zone, and downstream displacement of the inlet of the third zone to provide the inlet of the second displacement zone and upstream displacement of the outlet of the first zone to provide the outlet of the second displacement zone; and (ii) introduction of a certain volume of rinsing solution at the inlet of the first displacement zone and approximately simultaneous withdrawal of the same volume of rinsing solution recovered at the outlet of the first displacement zone;

(iii) introduction of a certain volume of rinsing solution at the inlet of the second displacement zone and approximately simultaneous withdrawal of the same volume of rinsing solution recovered at the outlet of the second displacement zone.

7. Process according to claim 1, wherein said displacement of the fronts displaces the fronts asynchronously in the different zones.

8. Process according to claim 7, wherein the displacement of the fronts comprises the following stages:

(i) creation of a first zone of a first displacement by fluid connection from the outlet of the first zone to the inlet of the second zone and by fluid connection from the outlet of the second zone to the inlet of the third zone; and creation of a second zone of a first displacement by fluid connection from the outlet of the third zone to the inlet of the fourth zone and by fluid connection from the outlet of the fourth zone to the inlet of the fifth zone and by fluid connection from the outlet of the fifth zone to the inlet of the first zone; and (ii) introduction of a certain volume of said solution at the inlet of the first displacement zone and approximately simultaneous withdrawal of the same volume of a liquid diluted with regenerating agent at the outlet from the first zone of a first displacement;

(iii) introduction of a certain volume of regenerating agent at the inlet of the second displacement zone and approximately simultaneous withdrawal of the same volume of a liquid diluted with said product of interest at the outlet from the second zone of a first displacement;

(iv) creation of a first zone of a second displacement by fluid connection from the outlet of the first zone to the inlet of the second zone and by fluid connection from the outlet of the second zone to the inlet of the third zone, and downstream displacement of the inlet of the first zone to provide the inlet of the first zone of a second displacement and upstream displacement of the outlet of the third zone to provide the outlet of the first zone of a second displacement; and creation of a second zone of a second displacement by fluid connection from the outlet of the third zone to the inlet of the fourth zone and by fluid connection from the outlet of the fourth zone to the inlet of the fifth zone and fluid connection from the outlet of the fifth zone to the inlet of the first zone, and downstream displacement of the inlet of the third zone to provide the inlet of the second displacement zone and upstream displacement of the outlet of the first zone to provide the outlet of the second displacement zone; and (vi) introduction of a certain volume of rinsing solution at the inlet of the first zone of a second displacement and approximately simultaneous withdrawal of the same volume of a liquid rich in the impurity or impurities that are retained relatively less at the outlet from the first zone of a second displacement.

(vii) introduction of a certain volume of rinsing solution at the inlet of the second zone of a second displacement and approximately simultaneous withdrawal of the same volume of a liquid rich in said product of interest at the outlet from the second zone of a second displacement.

9. Process according to claim 1, wherein stage (f) comprises a displacement of the fronts in all the zones before the periodical displacement.

10. Process according to claim 1, wherein the volume increment according to which said introduction points and said withdrawal points are displaced corresponds approximately to the volume of an entire fraction of a zone of absorbent material.

11. Process according to claim 1, wherein the periodical displacement of the stages is synchronous.

12. Process according to claim 1, wherein the periodical displacement of the stages is asynchronous.

13. Process according to claim 1, wherein said liquid diluted with said product of interest is sent at least partly to stage (b).

14. Process according to claim 1, wherein there is a supplementary zone, and in that it additionally comprises a stage (g) of introduction of all or part of the liquid diluted with said product of interest obtained in stage (a) in said supplementary zone, and recovery of approximately the same volume of rinsing solution at a point situated downstream of this zone.

15. Process according to claim 1, wherein stage (b) comprises two substages (b1) and (b2), as well as an intermediate stage of adjustment of a parameter of the solution, in particular by modification of the pH.

16. Process according to claim 1, wherein said liquid diluted with regenerating agent obtained in stage (c) is sent at least partly to stage (d), optionally after being topped up.

17. Process according to claim 1, wherein the recovered rinsing solutions are sent at least partly to stages (a) and/or (c).

18. Process according to claim 1, wherein the chromatography is an ion exchange chromatography and the product of interest is an amino acid, preferably lysine.

19. Process according to claim 1, wherein the chromatography is an ion exchange chromatography and the product of interest is insulin.

20. Process according to claim 1, wherein the chromatography is an affinity chromatography and the product of interest is IgG.

21. Process according to claim 1, wherein the chromatography is an affinity chromatography and the product of interest is a protein or a biomolecule.

* * * * *